US 6,570,648 B1

(12) United States Patent
Müller-Rees et al.

(10) Patent No.: US 6,570,648 B1
(45) Date of Patent: May 27, 2003

(54) MACHINE-DETECTABLE SECURITY MARKING WITH AN INCREASED LEVEL OF PROOF AGAINST FORGERY, PRODUCTION OF THE SECURITY MARKING, AND SECURITY SYSTEM COMPRISING THIS SECURITY MARKING

(75) Inventors: Christoph Müller-Rees, Pullach (DE); Jürgen Küpfer, München (DE); Horst Leigeber, Oberhaching (DE); Georg Schwalb, München (DE)

(73) Assignee: Wacker-Chemie GmbH, Munich (DE)

( * ) Notice: Subject to any disclaimer, the term of this patent is extended or adjusted under 35 U.S.C. 154(b) by 175 days.

(21) Appl. No.: 09/716,688

(22) Filed: Nov. 20, 2000

Related U.S. Application Data

(63) Continuation of application No. 09/129,577, filed on Aug. 5, 1998, now abandoned.

(30) Foreign Application Priority Data

Aug. 28, 1997 (DE) .......................... 197 37 618

(51) Int. Cl.⁷ ................................. G06K 9/74
(52) U.S. Cl. ...................... 356/71; 356/369; 356/364
(58) Field of Search .................. 356/71, 369, 364; 428/1.1, 916, 915, 913

(56) References Cited

U.S. PATENT DOCUMENTS

| 4,637,896 | A |   | 1/1987  | Shannon               |
|-----------|---|---|---------|-----------------------|
| 4,688,901 | A |   | 8/1987  | Albert                |
| 5,082,354 | A |   | 1/1992  | Kalmanash             |
| 5,211,877 | A |   | 5/1993  | Andrejewsui et al.    |
| 5,361,315 | A |   | 11/1994 | Muller-Rees et al.    |
| 5,362,315 | A | * | 11/1994 | Muller-Rees et al. ....... 106/493 |
| 5,678,863 | A | * | 10/1997 | Knight et al. ............... 283/109 |
| 5,683,622 | A |   | 11/1997 | Uratzchmuar et al.    |
| 5,695,680 | A |   | 12/1997 | Weitzel et al.        |
| 5,770,299 | A |   | 6/1998  | Dannenhauer et al.    |

FOREIGN PATENT DOCUMENTS

| DE | 39 42 663     | 6/1991 |
| DE | 39 42 663 A1  | 6/1991 |
| DE | 42 34 845 A1  | 4/1994 |

(List continued on next page.)

OTHER PUBLICATIONS

Liquid Crystals 1989 vol. 5, No. 3, 907–13 916; "Inverse Angle Dependence of the Reflection Colours of Cholesteric Polymeric Liquid Crystals Mixed With Pigments".
English Derwent Abstract AN 1994–184914 [23] corresponding to DE 42 40 743 A1.
English Derwent Abstract AN 1996–343521 [35] corresponding to EP 0 724 005.
English Derwent Abstract AN 1999–120624 [10] corresponding to WO 9902340.

(List continued on next page.)

Primary Examiner—Frank G. Font
Assistant Examiner—Roy M. Punnoose
(74) Attorney, Agent, or Firm—Brooks & Kushman P.C.

(57) ABSTRACT

The invention relates to a security marking whose level of proof against forgery is increased relative to known security markings, comprising liquid-crystalline material with chiral phase, wherein present within the security marking are at least two liquid-crystalline materials with chiral phase which differ in at least one property selected from the group consisting of handedness, color and color flop and which are arranged in the form of a structured or unstructured marking or a multilayer marking or in the form of liquid-crystalline pigments in a liquid-crystalline matrix, or wherein there is at least one liquid-crystalline material with chiral phase whose reflection band has been broadened by means of special techniques, or wherein there is at least one liquid-crystalline material with chiral phase which has a defined three-dimensional arrangement.

20 Claims, 6 Drawing Sheets-

| | FOREIGN PATENT DOCUMENTS | | |
|---|---|---|---|
| DE | 42 40 743 | 6/1994 | |
| DE | 37 32 115 C2 | 5/1996 | |
| DE | 195 41 028 C2 | 5/1997 | |
| DE | 195 44 130 A1 | 5/1997 | |
| DE | 196 39 165 | 6/1997 | |
| EP | 0 358 208 B1 | 3/1994 | |
| EP | 0 606 940 A2 | 7/1994 | |
| EP | 0606940 A2 * | 7/1994 | ............ G02B/5/30 |
| EP | 0 601 483 B1 | 9/1995 | |
| EP | 0 685 749 A1 | 12/1995 | |
| EP | 686 674 | 12/1995 | |
| EP | 724 005 | 7/1996 | |
| EP | 875 525 | 4/1998 | |
| GB | 2 268 906 | 1/1994 | |
| GB | 2 282 145 | 3/1995 | |
| JP | 8-146416 | 6/1996 | |
| WO | WO 94/22976 | 10/1994 | |
| WO | WO 95/24454 | 9/1995 | |
| WO | WO 99/02340 | 1/1999 | |

OTHER PUBLICATIONS

English Derwent Abstract AN 1995–383808 [50] corresponding to EP 686674.
English Derwent Abstract AN 1998–559398 [48] corresponding to EP 875525.
English Derwent Abstract AN 1997–299525 [18] corresponding to DE 196 39 165.
Derwent Abstract #91–231516[323] corresponding to DE 39 42 663 A1.
Derwent Abstract # 97–290514[27] corresponding to DE 195 44 130 A1.
Derwent Abstract #96–324860 [33] corresponding to JP 08 146416.
Derwent Abstract #89–107367 [15] corresponding to DE 37 32 115.
Derwent Abstract #97–247405 [23] corresponding to DE 19541028.
Derwent Abstract #91–231516 [32] corresponding to DE 3942663.

* cited by examiner

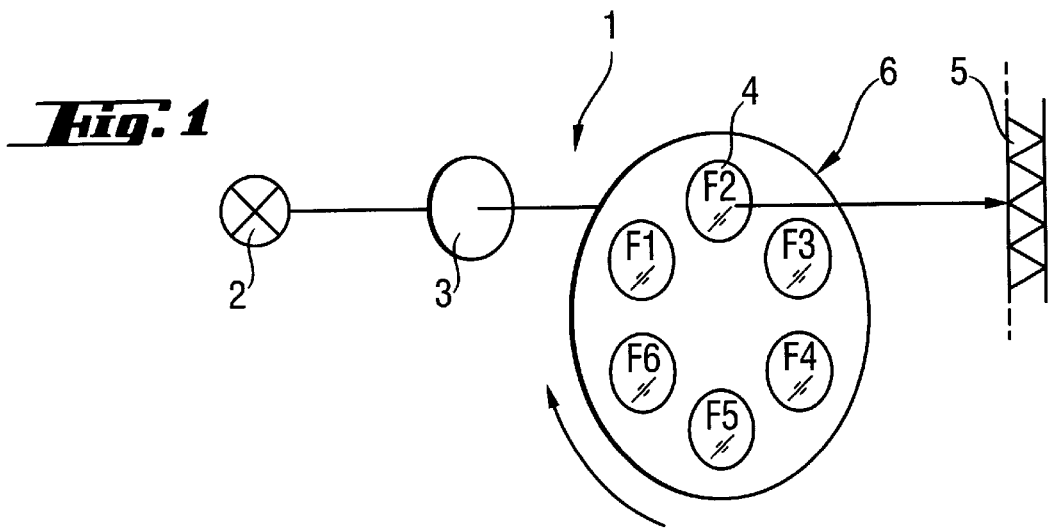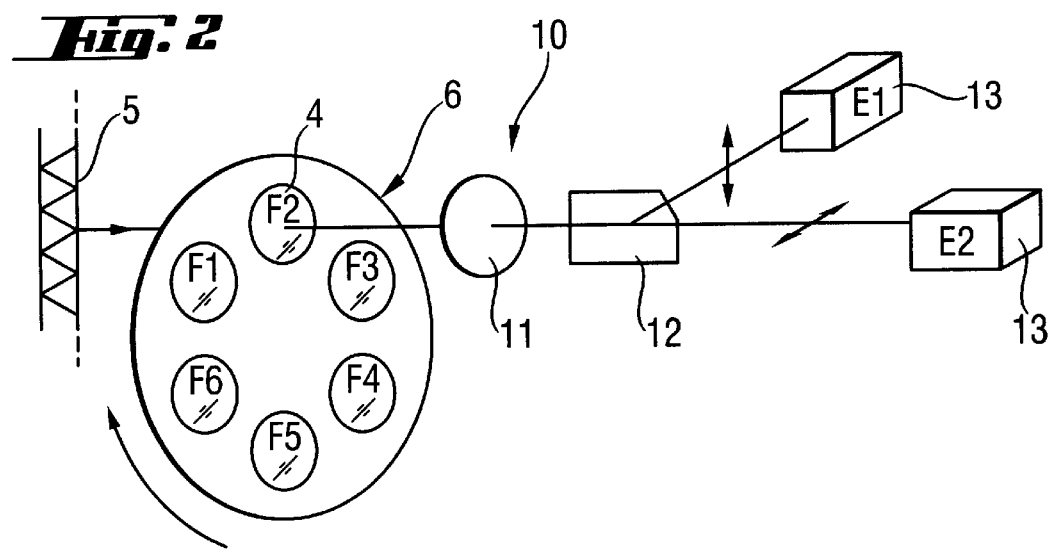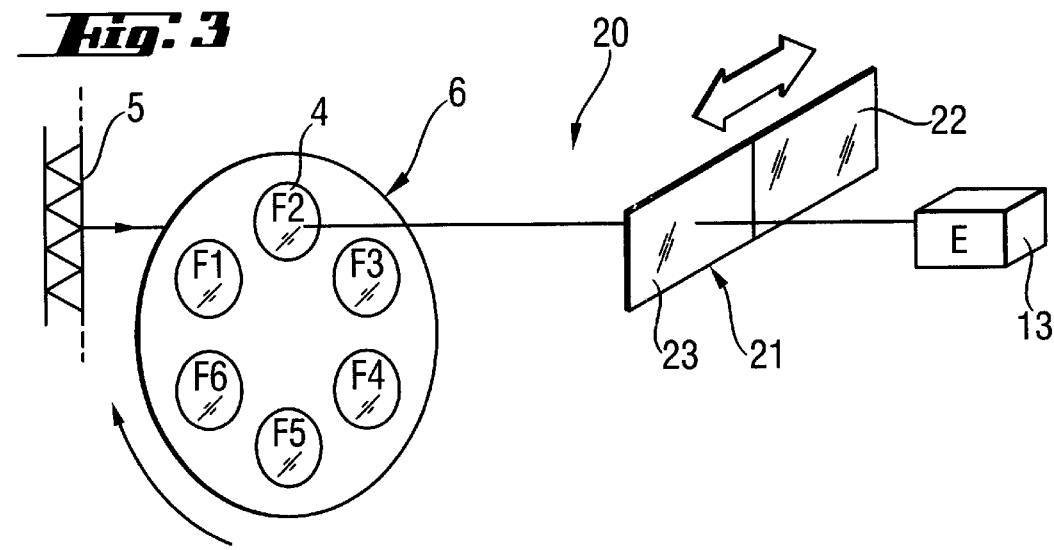

MACHINE-DETECTABLE SECURITY MARKING WITH AN INCREASED LEVEL OF PROOF AGAINST FORGERY, PRODUCTION OF THE SECURITY MARKING, AND SECURITY SYSTEM COMPRISING THIS SECURITY MARKING

This is a continuation of application(s) Ser. No. 09/129,577 filed on Aug. 5, 1998 now abandoned.

BACKGROUND OF THE INVENTION

1. Field of Invention

The invention relates to a machine-detectable security marking with an increased level of proof against forgery, to the production of the security marking and to a security system comprising this security marking.

2. Description of the Related Art

The growing technical maturity of color copiers is leading to copies whose color, resolution and quality are increasingly difficult to distinguish from the originals. As protection against forgery using color copiers or scanners, the use of optically variable elements is becoming more and more widespread as a security marking for data carriers. A common feature of such markings is that the color or brightness they present varies depending on the conditions under which they are illuminated and observed. The most common optically variable security markings include diffraction gratings, holograms, interference coatings, metameric inks and polarizing coatings.

DE 195 41 028 describes effect coating materials for articles that are to be coated, comprising liquid-crystal pigments, which carry a label for recognition and characterization of the article. Labeling in this case is via the surface structure of the pigments with a layer thickness of >0.5 $\mu$m, in accordance with the barcode principle, or by defined spectral characteristics or by color patterns. Also described are processes for producing the effect coating material and the marked pigments.

DE 3942663 discloses data carriers with an optically variable security element. The security element comprises a liquid-crystal material comprising liquid-crystal polymer in oriented form at room temperature, which is present as a solid. DE 3942663 discloses the use of liquid-crystal polymer systems having lattice constants of 300–1000 nm, which with an average refractive index of normally 1.5 for liquid-crystalline materials gives a reflection wavelength of from 450 to 1500 nm for the liquid-crystalline material. Also disclosed are the optional combination of the LC system with "conventional inks", semifinished articles and processes for producing the security elements, and methods and mechanical test setups for detecting color, color flop and polarization of the security elements. The center wavelength test performed therein is inadequate for an increased level of proof against forgery. This is demonstrated in the comparative example of the present application.

DE 19544130 discloses optically variable security elements comprising at least two printed-on layers. The first printed-on layer is structured, with a color contrasting with the data carrier, and the second printed-on layer is configured with optically variable pigments, with little or no mass tone, and is at least partly superimposed on the first printed-on layer. A description is also given of preparation techniques for optically variable security elements of this kind.

BRIEF SUMMARY OF THE INVENTION

It is an object of the invention to provide security markings whose level of proof against forgery is greater than that of known security markings.

This object is achieved by a security marking comprising liquid-crystalline material with chiral phase, wherein present within the security marking are at least two liquid-crystalline materials with chiral phase which differ in at least one property selected from the group consisting of handedness, color, and color flop, and which are arranged in the form of a structured or unstructured marking, a multilayer marking, in the form of liquid-crystalline pigments in a liquid-crystalline matrix, wherein there is at least one liquid-crystalline material with chiral phase whose reflection band has been broadened by means of special techniques, or wherein there is at least one liquid-crystalline material with chiral phase which has a defined three-dimensional arrangement.

The security marking of the invention can only be reproduced with a level of complexity which is substantially higher than that of prior art markings, which leads to a security marking having an increased level of proof against forgery.

The invention also relates to articles labeled with the security marking of the invention, to processes for preparing the security markings, and to a security system employing these markings.

BRIEF DESCRIPTION OF THE DRAWINGS

FIG. 1 illustrates one embodiment of a security marking identification system employing beam focusing with color selection;

FIG. 2 illustrates one embodiment of a detection system involving both colors election and polarization selection;

FIG. 3 illustrates a further embodiment of the detection system of FIG. 2 employing but a single light receiving unit;

DETAILED DESCRIPTION OF THE INVENTION

Figure 4:
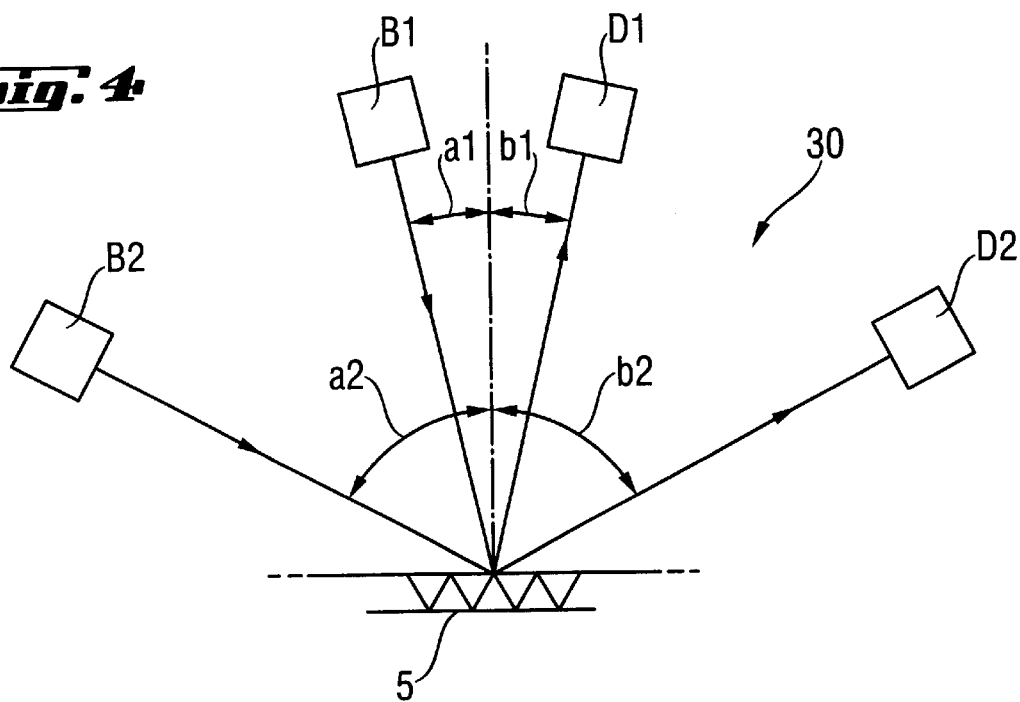
FIG. 4 illustrates one embodiment of a basic test setup employing multiple light sources and multiple detectors.

The human eye is able to perceive light in the spectral region from about 400 to 700 nm. Consequently, liquid-crystalline materials with chiral phase whose longwave flank of the reflection band is above 420 nm or whose shortwave flank of the reflection band is below 700 nm produce an impression of color to the human eye. Owing to the color flop of these materials, the impression of color is able to appear only at certain viewing angles. By color herein, however, is meant not only the perceived color of the wavelength range of visible light that can be perceived by the human eye but also the color in the adjacent UV and IR wavelength regions that is imperceptible to the human eye but can be measured by means of known instruments such as UV and IR spectrometers.

The human eye is unable to detect the polarization state of the light it is receiving. As a result, the human eye does not distinguish between two liquid-crystalline materials with chiral phase which have the same color and the same color flop but different handednesses. The difference in handedness can be detected by machine testing. Preferably, the marking of the invention, which is difficult if not impossible for forgers to perceive, exhibits different, machine-detectable properties at defined positions of the marked article. This combination increases still further the level of proof against forgery. The invention hence also relates to articles which are labeled with the security marking of the invention in such a way that the security marking of the invention has different, machine-detectable properties at defined positions of the marked article.

For the purposes of the present invention, the following terms are defined as described below:

Center wavelength and bandwidth of a reflection band result from a plot of the intensity of a reflection band as a function of the wavelength, as follows:

The value of the maximum intensity of a reflection band is halved. A connecting line parallel to the x-axis (wavelength scale) at the level of the halved intensity intersects the reflection band at a shortwave position and at a longwave position. The distance between these two intersects parallel to the x-axis is the bandwidth of the reflection band.

The center wavelength of the reflection band is obtained by drawing a line parallel to the y-axis down to the x-scale, this line passing through the midpoint of the reflection bandwidth. The center wavelength corresponds to the wavelength value obtained at the intersect of this parallel with the reflection band.

Flank of the reflection band: the wavelength at which the intensity of the reflection band has dropped to 10% of its maximum. The "shortwave flank of the reflection band" corresponds to the wavelength at which the shortwave branch has dropped to 10% of the maximum intensity, and the "longwave flank of the reflection band" corresponds to the wavelength at which the longwave branch has dropped to 10% of the maximum intensity.

Color flop: spectral color shift of the reflected/transmitted light when light incidence is nonperpendicular. The extent of the flop at a given angular configuration is a property intrinsic to the material and is determined by the average refractive index of the liquid-crystalline molecules. It can be calculated in accordance with the formula described in DE 3732115:

$$\lambda(a) = \lambda(0) \cdot \cos[\arc \sin(\sin(a/n))] \quad (1)$$

Polarization and handedness: liquid-crystalline materials with chiral phase have a left- or right-handed helical structure. The wavelength-selectively reflected light undergoes left- or right-handed circular polarization and is accordingly denoted below as lh or rh.

The security elements of the invention are preferably constructed as a structured security marking comprising at least two different liquid-crystalline species; an unstructured security marking comprising at least two different liquid-crystalline species; a security marking produced by a multilayer technique, comprising at least two different liquid-crystalline species; or a security marking comprising liquid-crystalline material into which liquid-crystalline pigments have been incorporated.

One form of the security marking of the invention employs at least two liquid-crystalline materials with chiral phase which differ in at least one property selected from the group consisting of handedness, color, or color flop, and which are arranged in the form of a structured marking.

A marking is structured if the human eye is able to perceive, within the marking, uniform areas having different properties, such as color, brightness, etc. For the purposes of this invention, the minimum size of such areas is regarded as being an extent of 100 µm. A marking is also structured when the areas with an extent greater than 100 µm differ only in the property of polarization, which is imperceptible to the eye.

A further form of the security marking of the invention employs at least two liquid-crystalline materials with chiral phase which differ in at least one property selected from the group consisting of handedness, color, and color flop, and which are arranged in the form of an unstructured marking.

A marking is unstructured if no structured marking is present, i.e. if the human eye perceives the marking as a uniform area. This is also the case if very small uniform areas with a size in the range below 100 µm, having different properties, are present adjacently. This is the case, for example, if two different LC pigments are applied as a mixture to one area.

A further form of the security marking of the invention employs at least two liquid-crystalline materials with chiral phase which differ in at least one property selected from the group consisting of handedness, color and color flop and which are arranged atop one another by a multilayer technique.

A multilayer technique preferably comprises processes in which the liquid-crystalline materials are arranged atop one another without an interlayer. This reduces the thickness of the security element of the invention.

A further form of the security marking of the invention employs at least two liquid-crystalline materials with chiral phase which differ in at least one property selected from the group consisting of handedness, color, and color flop, and which are arranged in the form of LC pigment in a liquid-crystalline matrix.

A further form of the security marking of the invention employs a liquid-crystalline material with chiral phase in a defined three-dimensional arrangement. By such is meant a planar security marking in which a layer of at least one liquid-crystalline material with chiral phase is incorporated, over the whole area or as an LC pigment layer, in such a way that the normal to this layer occupies, dependent on position, different angles relative to the normal to the surface of the security marking. Owing to the color flop associated with the different angles, the observer sees different colors depending on position. Depending on the viewing angle of the observer there is, in addition, a color flop of these position-dependently different colors.

A further form of the security marking of the invention employs at least one liquid-crystalline material with chiral phase whose material-specific reflection bands have been broadened by a special technique. The possibility provided by this technique of controlling the bandwidth of the reflection band enables new kinds of color effects to be achieved and, owing to the more complex mode of production, increases the level of proof against forgery of the security marking.

Liquid-crystalline materials with chiral phase which can be used to produce security markings of the invention are known from the prior art: for example, from the documents specified in Examples 1.1 to 1.5.

Table 1 summarizes the selection of liquid-crystalline materials with chiral phase described in the examples, and also processes for producing security markings of the invention from these materials, under the abovementioned generic terms.

TABLE 1

| Group code for type of security marking | Liquid-crystalline material with chiral phase used | | Production of security marking by whole-area application according to Example | Production of security marking from LC pigments according to Example |
|---|---|---|---|---|
| | Wavelength range of the material according to Example | Rotational sense of the light reflected with circular polarization | | |
| I Uniform security marking comprising one liquid-crystalline species | | | | |
| I1 | 2.2 | rh or lh | 3.1 | 3.21, 3.22 |
| I2 | 2.4 | rh or lh | 3.1 | 3.21, 3.22 |
| I3 | 2.6 | rh or lh | 3.1 | 3.21, 3.22 |
| II Structured security marking comprising at least two different liquid-crystalline species | | | | |
| II1 | 2.7 | Material 1: rh<br>Material 2: lh | 3.2, 3.3 | 3.23, 3.24 |
| II2 | 2.8 | Material 1: rh or lh<br>Material 2: rh or lh | 3.4, 3.5 | 3.25, 3.26 |
| II3 | 2.9 | Material 1: rh<br>Material 2: lh | 3.6, 3.7 | 3.27, 3.28 |
| III Unstructured security marking comprising at least two different liquid-crystalline species | | | | |
| III1 | 2.7 | Material 1: rh<br>Material 2: lh | — | 3.29, 3.30 |
| III2 | 2.8 | Material 1: rh or lh<br>Material 2: rh or lh | — | 3.31, 3.32 |
| III3 | 2.9 | Material 1: rh<br>Material 2: lh | — | 3.33, 3.34 |
| IV Security marking by multilayer technique | | | | |
| IV1 | 2.7 | Material 1: rh<br>Material 2: lh | 3.10, 3.11 | 3.40–3.43 |
| IV2 | 2.8 | Material 1: rh or lh<br>Material 2: rh or lh | 3.12, 3.13 | 3.44–3.47 |
| IV3 | 2.9 | Material 1: rh<br>Material 2: lh | 3.14, 3.15 | 3.48–3.51 |
| VI Security marking comprising liquid-crystalline material into which liquid-crystalline pigments have been incorporated | | | | |
| V1 | 2.7 | Material 1: rh<br>Material 2: lh | 3.17 | 3.52, 3.53 |
| V2 | 2.8 | Material 1: rh or lh<br>Material 2: rh or lh | 3.18 | 3.54, 3.55 |
| V3 | 2.9 | Material 1: rh<br>Material 2: lh | 3.19 | 3.56, 3.57 |
| VI Three-dimensional arrangement of a uniform liquid-crystalline material in security marking | | | | |
| VI1 | 2.1, 2.2, 2.3, 2.4, 2.5, 2.6 | rh or lh | 3.20 | 3.58, 3.59 |

The invention additionally relates to processes for producing security markings of the invention. The markings of the invention of the invention can be produced as described, for example, in the examples. The security marking can also be produced, inter alia, by a multilayer technique.

The process of preparing the security markings of the invention comprises arranging at least two liquid-crystalline materials with chiral phase which differ in at least one property selected from the group consisting of handedness, color, and color flop, in the form of a structured or an unstructured marking; a multilayer marking; or in the form of liquid-crystalline pigments in a liquid-crystalline matrix; or which comprises processing at least one liquid-crystalline material with chiral phase whose reflection band has been broadened by special techniques, in a manner known per se, to form a security marking, or which comprises processing at least one liquid-crystalline material with chiral phase in a defined three-dimensional arrangement to form a security marking.

The invention additionally relates to a security system comprising the security marking of the invention and to a test setup for recognizing the security marking.

The security system of the invention is a combination of a liquid-crystalline material with chiral phase which has been processed to form a forgery-proof security marking of the invention, and a test setup for preferably complete identification of the properties which are characteristic of the liquid-crystalline materials and are selected as relevant for the security marking.

Properties selected as relevant are preferably the handedness, the color, or the color flop of the respective liquid-crystalline material with chiral phase, or the defined arrangement of the material. The color is determined by measuring the form of the reflection band of the liquid-crystalline material with chiral phase. The color flop is determined by measuring at least two center wavelengths, determined at different angular configurations, of the reflection band of the liquid-crystalline material with chiral phase (also called LC material or LC species below). The handedness of the material is determined by measuring the polarization of the light reflected by the liquid-crystalline material with chiral phase. The defined arrangement of the material is determined by measuring the abovementioned properties separately for each liquid-crystalline component of the material.

Known test setups, although likewise suitable for detection, do not fully utilize the possibilities of LC security markings (see comparative example). A test setup which is preferentially suited to testing the security markings of the invention detects the characteristic form of the reflection band by determining the intensity of reflection at at least two spectrally different points of the reflection band. Preferably, the test setup detects the characteristic form of the reflection band by carrying out measurement at the center (center wavelength) of the reflection band and in the wavelength range where the intensity of the reflection band reaches less than 50% of its maximum. With particular preference, the test setup detects the characteristic form of the reflection band by carrying out measurement at the center (center wavelength) of the reflection band and in the wavelength range of the reflection band where the intensity of the reflection band is less than 10% of its maximum.

For the purposes of the invention the term "test setup" means an arrangement in which the security marking is illuminated by one or more lighting units and the light reflected or transmitted by the security marking is tested in one or more detection units.

A lighting unit (B, B1, B2, B3) consists of a light source and optionally an imaging system (for example, a condenser), one or more wavelength-selective elements, such as color filters and heat filters, and also, if desired, optical waveguides. The selection and number of the filters depends on the test setup used and on the security marking to be tested, and is described in detail in connection with respect to the test setups.

The selection of the light sources is described below.

A distinction is made between directed lighting units, characterized by an illumination-side aperture angle of <10°, and diffuse lighting units, which can be realized, for example, by using an Ulbricht sphere, with illumination-side aperture angles of >10°.

Lighting units which can be employed with preference in the test setup are:

LU1: Lighting Unit 1 with Beam Focusing and Color Selection

This directed lighting unit consists of a light source 2, a condenser 3, and one or more wavelength-selective elements 4. An illumination system of this kind is shown by way of example in FIG. 1. The light that falls on the security marking 5 undergoes spectral selection by color filters 4. This selection takes place, for example, as a result of the filters being arranged, as depicted in FIG. 1, on a rotary filter wheel 6. An alternative option is to arrange these filters on a movable slide.

LU2: Lighting Unit with Beam Focusing

This directed lighting unit consists of a light source and a condenser. It corresponds to an illumination source as depicted in FIG. 1 but without color-selective filters.

LU3: Lighting Unit with Optical Waveguide

Instead of two or more light sources for illumination, it is possible using two or more optical waveguides which start from only one light source to illuminate the security element from two or more angles. The security element is illuminated with the optical waveguides and with an imaging optic which points toward the security marking.

LU4: Lighting Unit with Directed Light Source

Light sources where without further optical auxiliary components the light is emitted with an aperture of <10°, examples being lasers.

LU5: Lighting Unit for Areal Illumination

The illuminated area should be chosen so that the representative properties are characterized correctly when the security marking is tested. For example, in the case of mixtures of different pigments, a representative number of individuals should in each case lie within the illuminated spot. In the case of structured security elements, the entire element, or at least a characteristic part of the element, should lie within the illuminated spot. An areal illuminator can be constructed, for example, such that a directed lighting unit undergoes beam expansion by means of a single-lens or multilens imaging system.

LU6: Diffuse Lighting Unit (e.g. Ulbricht Sphere)

Instead of illumination at selected angles a1, a2, etc., diffuse illumination at all solid angles is carried out. This is done, for example, by using an Ulbricht sphere. As illumination for the Ulbricht sphere, a light source is used which covers a spectral region larger than the spectral region reflected by the security marking under all angles of illumination between 0° and 90°.

Examples of broadband light sources for the UV range are deuterium lamps, high-pressure mercury lamps or xenon lamps. Examples of broadband light sources in the visible range are tungsten halogen lamps, high-pressure mercury lamps, fluorescent lamps or xenon lamps. Examples of broadband light sources for the IR range are tungsten halogen lamps, high-pressure mercury lamps or xenon lamps.

Instead of the light selected spectrally by means of filters, it is also possible to use light sources whose light emission is limited to narrow ranges of the spectrum and whose wavelength corresponds to the center wavelength of the reflection band of the liquid-crystalline material with chiral phase. Examples of such monochromatic and wave-selected light sources are laser light or metal vapor lamps.

The selection of the detection units D (D1, D2, D3) is set out below:

A detection unit consists of one or more receivers preceded optionally by color- and/or polarization-selective elements. The selection and number of the filters depends on the test setup used and on the security marking to be tested, and is described in detail in connection with the account of the test setups. The receiver should preferably only detect the light intensity and not react selectively to color or polarization. For example, in the UV and visible spectral regions it is possible to employ a photomultiplier or a silicon photodiode and for the IR region a PbS (lead sulfide) element. Detection units suitable for the test setup are described by way of example below.

DU1: Detector 10 with Polarization Selection and Wavelength-selective Filter with Two Receivers FIG. 2 shows by way of example a detection system in which there is both color selection and polarization selection. The light reflected by the security marking 5 is selected by various color filters 4 brought into the beam path by means, for example, as depicted, of a filter wheel 6. An alternative option is to arrange these filters on a movable slide. The color-selected light impinges subsequently on the lambda/4 delay element 11. In this element, the circular-polarized light from the security marking is converted into linear-polarized light. In the subsequent polarization-selective beam splitter prism 12, there is selection into the two mutually perpendicular polarization directions. The two polarized component beams impinge subsequently on the respective receiver 13, E1 or E2. In selecting the optical elements, account should be taken of the criteria, known to the skilled worker, for adaptation to the selected spectral region.

The lambda/4 delay element 11 is required, for example, to maintain its delaying property over the selected spectral region. Suitable examples are, in the UV region, Fresnel rhombi made of calcite, and, in the visible and IR region, wavelength-selected, oriented PC films or Fresnel rhombi made of calcite.

The polarizing beam splitter prism for the spatial separation of the two linear polarization components can be, for example, a Glan-Thompson prism with air gap for the UV range and visible spectral region, or with IR-transparent cementing for the IR range. The selection angle of this type of prism is independent of wavelength.

DU2: Detector 20 with Polarization Selection and Wavelength-selective Filter and One Receiver The detection setup DU1 is modified so that only one receiver 13 is used. This is depicted by way of example in FIG. 3. The light reflected by the security marking 5 is selected by various color filters 4 which are brought into the beam path by means, for example, as depicted, of a filter wheel 6. An alternative option is to arrange these filters on a movable slide. The color-selected light impinges subsequently on right-handedly 22 and left-handedly 23 circular-polarizing elements which are brought into the beam path using, for example, as depicted, a movable slide 21. As circular-polarizing elements it is possible, for example, to use appropriate, commercially available films.

DU3: Detector with Wavelength-selective Filter

The light reflected by the security marking is selected by means of various color filters which are brought into the beam path by means, for example, of a filter wheel or a movable slide.

DU4: Two Detectors with Polarization Selection

Corresponds to a setup as described under DU1 but without color selection by means of filters.

DU5: Detector with Polarization Selection

Corresponds to a setup as described under DU2 but without color selection by means of filters.

DU6: Detector without Selection of Color and Polarization

The light reflected by the security marking is detected without selection, i.e. neither by color testing nor by polarization testing.

DU7: Video Camera as Detector

Instead of a receiver which is only integrally radiation-sensitive, locally resolved detection of the incident radiation is achieved by using, for example, a video camera. The system consists of a series of polarizers and/or color filters which can be brought into the beam path, a video camera, and the associated evaluation electronics. An imaging system, consisting of one or more lenses, focuses the light from the security element into the video camera.

Alternatively, the color filters and/or polarizers can also be accommodated in the beam path between light source and marking.

The selection of the selective components, such as filters and polarizers, is subject to the criteria specified in the test setups.

General criteria for the rational combination of the lighting units with the detection units are:

a) The color filters should be used either in the lighting unit or in the detection unit.

b) The polarization can be tested at all angular configurations or only at one angular configuration.

The combination of lighting unit and detection unit to form various test setups is described by way of example below:

Test Setup 1 (TS1)

FIG. 4 shows the basic configuration of the test setup 1, 30. A security marking 5 with liquid-crystalline material is irradiated either simultaneously or in succession by the lighting units B1 and B2, and the light which has been color- and polarization-selected by the security marking is detected by the detector units D1 and D2 and analyzed.

The color of the security marking 5 is tested at angular configuration a1, b1, with a1 being defined as the angle between the illuminating light beam starting from lighting unit B1 and the normal to the security marking 5, and b1 being defined as the angle formed by the detector D1 with the normal to the security marking. The light beam from B1 to the security marking and the reflected beam from the security marking to D1 define the plane of incidence of the angular configuration (a1, b1).

a2 defines the angle between the illuminating light beam from the light source B2 and the normal to the security marking, and b2 defines the angle formed by the detector 2 with the normal to the security marking. The light beam from B2 to the security marking and the reflected beam from the security marking to D2 define the plane of incidence of the angular configuration (a2, b2). The two angular configurations (a1, b1) and (a2, b2) can have different planes of incidence.

The angles should preferably meet the following criteria:

$a1=b1$, where for $a1$: 0° to <10°

$a2=b2$, where for $a2$: 10° to <90°

Observing the Bragg condition, although not mandatory, is preferred.

The characteristic form of the reflection band is detected by carrying out detection at at least three spectrally different points in the center and in the flanks of the reflection band.

At the center wavelength of the reflection band, i.e. at maximum signal intensity, there is preferably, in addition, examination of the polarization property of the security marking.

At angular configuration (a2, b2) there is again testing of the color, which owing to the condition a2>a1 shows a shift toward shorter wavelengths.

The text below describes different variants of the filter selection for examining the security-relevant properties for the test setup 1:

FP1-1: Simple Testing for Color and Color Flop

Figure 5:
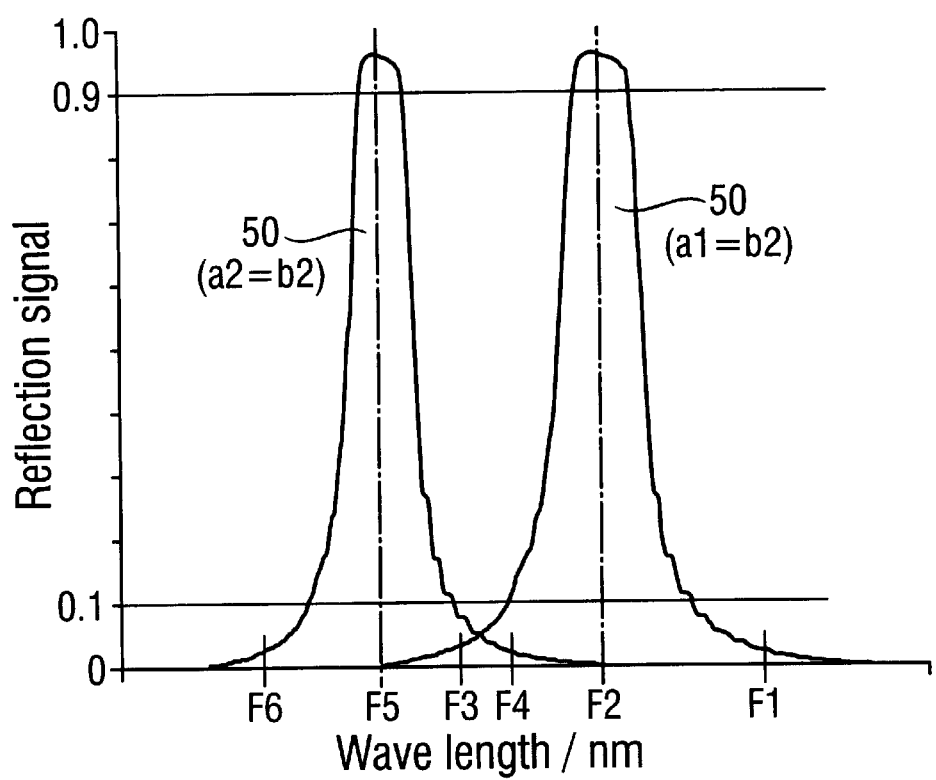
FIG. 5 illustrates typical reflection band spectra obtained from the test setup of FIG. 4 when the Bragg angle conditions are observed employing one set of color filters.

FIG. 5 shows two reflection bands 50 as are typical for the claimed security markings if illumination and detection take place at two different angles a1, b1 and a2, b2. Recognizing these two bands as a characteristic feature of the claimed security markings is carried out by three narrowband filters per band.

The filters used are preferably interference filters whose bandwidth is chosen, in relation to the reflection band of the security element to be detected, such that the bandwidth of the filter is between 0.5 and 5%, and is preferably 1%, of the wavelength of the middle value of the reflection band.

If, for example, the center wavelength of the reflection band is 1000 nm, then preference is given to the use of a filter having a bandwidth of 10 nm.

The filters used (e.g. F1 to F6 in FIG. 5) should be chosen such that the following is true for their maximum transmission:

F1 is chosen so that the wavelength value of the maximum transmission of the filter corresponds to the wavelength value at which the intensity of the longwave band at angular position (a1, b1) has fallen to <10% of the maximum reflection in the center of the band.

F2 is chosen so that the center wavelength of the band is detected at angular position (a1, b1).

F3 is chosen so that the wavelength value of the maximum transmission of the filter corresponds to the wavelength value at which the intensity of the shortwave band at angular position (a1, b1) has fallen to <10% of the maximum reflection in the center of the band.

F4 is chosen so that the wavelength value of the maximum transmission of the filter corresponds to the wavelength value at which the intensity of the longwave band at angular position (a2, b2) has fallen to <10% of the maximum reflection in the center of the band.

F5 is chosen so that the center wavelength of the band at angular position (a2, b2) is detected in accordance with the color flop condition, according to equation (I) of the liquid-crystalline species.

F6 is chosen so that the wavelength value of the maximum transmission of the filter corresponds to the wavelength value at which the intensity of the shortwave band at angular position (a2, b2) has fallen to <10% of the maximum reflection in the center of the band.

The use of six filters permits the detection of all described security features with one LC species, independently of the width of the reflection band.

FP2-1: Expanded Testing for Color and Color Flop to Increase the Level of Proof Against Forgery The use of two or more additional filters which in terms of their spectral transmittance lie between the wavelength values of F1 and F2 or of F2 and F3, respectively, permits even more precise detection of the characteristic reflection band at a1, b1.

This applies alternatively to (a2, b2), where further filters can be placed between F4 and F5 or F5 and F6, respectively. This increases still further the level of proof against forgery.

Figure 6:
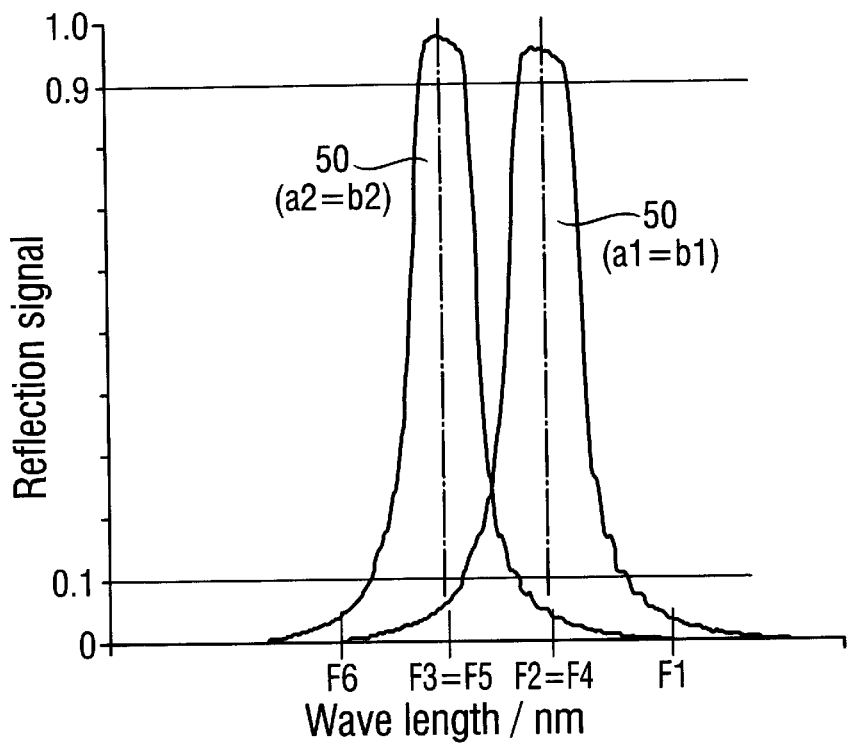
FIG. 6 illustrates a reflection band similar to that of FIG. 5 but employing a different set of filters.

FP3-1: Testing for Color and Color Flop with a Reduced Number of Filters by Appropriate Choice of the Angular Configuration FIG. 6 shows the spectra 50 already known from FIG. 5, with the criteria for the selection of the filters F1 to F6 being valid as described for FP1-1.

If the conditions for the two angles (a1, b1) and (a2, b2) are chosen such that at filter 2 the center wavelength of the band at angular position (a1, b1) is detected and, at the same time, at angular position (a2, b2) the decrease in the flank of the longwave band to <10% of the maximum reflection in the center of the band can be detected, and additionally such that at filter 4 the center wavelength of the band at angular position (a2, b2) is detected and, at the same time, at angular position (a1, b1) the decrease in the flank of the shortwave band to <10% of the maximum reflection in the center of the band can be detected, then only four filters are required. In accordance with the definition given in FP1-1 the following is then the case: F1, F2=F4, F3=F5, F6.

FP4-1: Expanding the Color Testing FP3-1 by Using Further Color Filters

The use of two or more additional filters which in terms of their spectral transmittance lie between the wavelength values of F1 and F2 or of F2 and F3 or of F5 and F6, respectively, in the color test FP3-1 (FIG. 6) permits even more precise detection of the characteristic reflection band. This increases still further the level of proof against forgery.

FP5-1: Color Testing and Color Flop Testing with Structured Security Markings (II1–II3) and Three-dimensionally Embedded Security Marking (VI1)

If a security marking consists of more than one LC species, then the individual LC species can be selected in the area by moving the marking or the test setup.

If there are two or more different liquid-crystalline species of unequal color within the area of illumination/detection, then a further set of filters, in accordance with the criteria described for FP1-1 to FP5-1, respectively, is required per liquid-crystalline species. For this purpose, test setup PA1 can be constructed as a double or multiple system, with the second and further illumination and detection groups rotated circularly about the normal on the sample surface.

PP1-1: Testing for Polarization

The polarization of the security marking is tested in the test setup TS1 at the angular position (aa, b1) or (a2, b2). Preference is given to the angular position (a1, b1) with the filter position F2.

In accordance with the specified criteria, the following combinations of lighting units LU1 to LU7 and detection units DU1 to DU7 are preferred in the test setup 1:

| B1 | B2 | D1 | D2 | Notes |
|---|---|---|---|---|
| LU2 | LU2 | DU1 | DU3 | Filter selection for DU1 and DU3 in accordance with FP1-1 to FP4-1 |
| LU5 | LU5 | DU1 | DU3 | Filter selection for DU1 and DU3 in accordance with FP1-1 to FP4-1 |
| LU3 | | DU1 | DU3 | B1 and B2 are realized by a light source LU3 with two optical waveguides |
| LU6 | | DU1 | DU3 | B1 and B2 are realized by a diffuse lighting unit LU6 |

Test Setup 2 (TS2)

Figure 7:
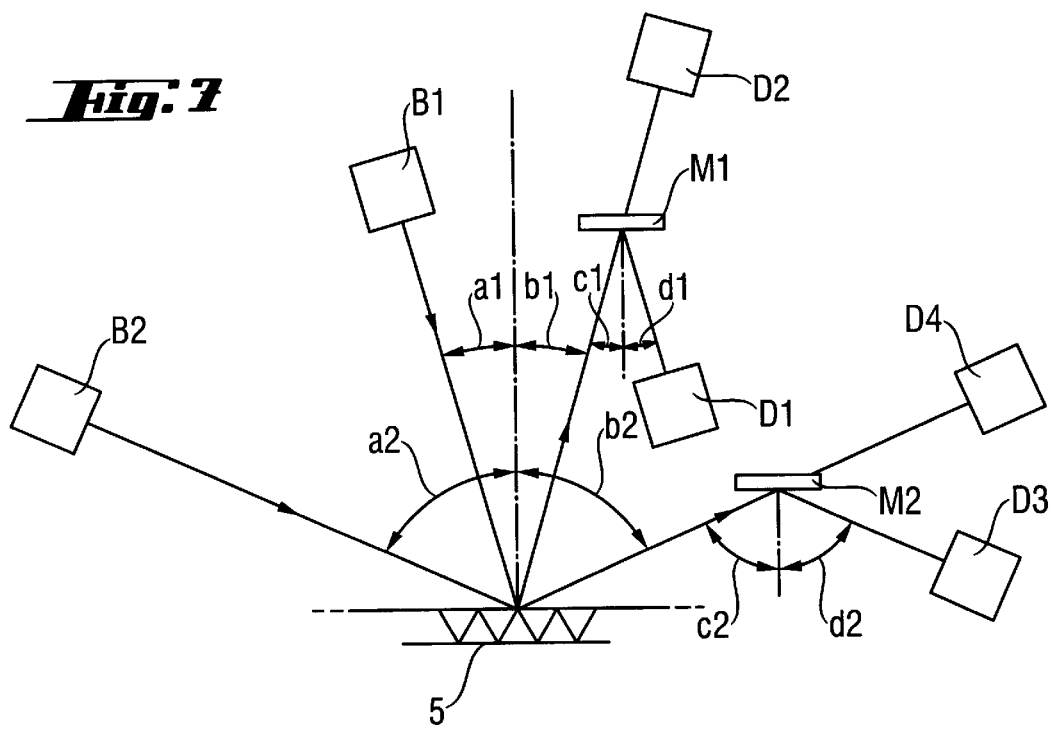
FIG. 7 illustrates a detection system where a security marking to be tested is compared to a "master" security marking of the same type.

FIG. 7 shows a variant of how security markings 5 with liquid-crystalline materials can be tested. In this variant, the security marking to be tested is compared directly in the detection unit with a liquid-crystalline material of the same type as the security marking 5 (master) (M1/M2). The master has the sane reflection properties as the security marking to be tested, but is applied to a transparent support. The security marking is illuminated simultaneously or in succession by means of the lighting units B1 and B2 at the angles a1 and a2. Examples of such lighting units are the systems described under LU2 or LU5.

The light that is wavelength- and polarization-selectively reflected by the security marking at the angle b1 or b2 impinges at the angles c1 and c2, respectively, on the master located within the overall setup (M1 or M2 respectively) and from there is reflected completely at the angle d1 or d2 into the detector D1 or D3, respectively. A detector of this kind is, for example, the system described in DU6.

In this test setup, the angles are required to meet the following criteria:

$a1=c1$, where for $a1$: 0° to <10°

$a2=c2$, where for $a2$: 10° to <90°

$b1=d1$, where for $b1$: 0° to <10°

$b2=d2$, where for $b2$: 10° to <90°

Observing the Bragg conditions, although preferred, is not mandatory.

In the case of a forged element, there occurs a false polarization component and/or light outside the reflection band. This light is transmitted by the master and arrives at detector D2 or D4. Owing to the different incidence of the light on the detectors it is possible to distinguish genuine security markings and forged security markings from one another reliably and with great sensitivity.

Test Setup 3 (TS3)

Figure 8:
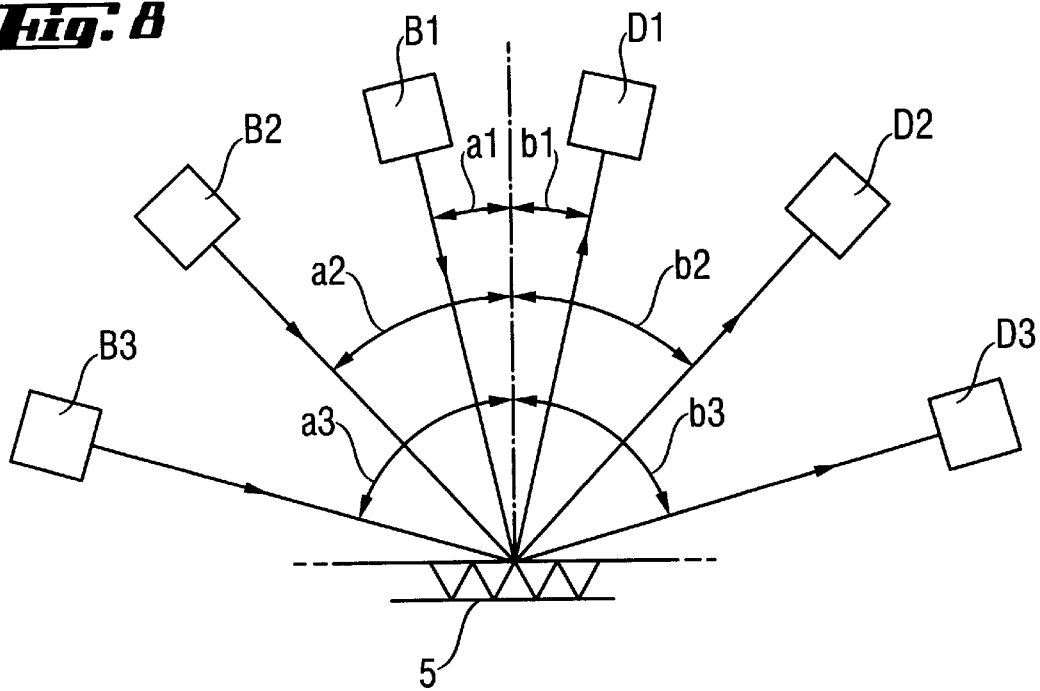
FIG. 8 illustrates a further test setup for security markings wherein three light sources and three light detectors are employed.

FIG. 8 shows a further variant of how security markings 5 with liquid-crystalline materials can be tested. The security marking 5 is illuminated by three lighting units (B1, B2, B3) at three angles (a1, a2, a3) and the reflected light is detected at three angles (b1, b2, b3) by the detection units (D1, D2, D3). This requires at least three filters, which given an appropriate choice of the angles of illumination can have identical specifications. A feature of this setup over the test setup TS1 is that there is no need for moving parts, such as, for example, a filter wheel.

The angles in this test setup preferably meet the following criteria:

$a1=b1$, where for $a1$: 0° to <10°

$a2=b2$, where for $a2$: 10° to <90°

$a3=b3$, where for $a3$: 10° to <90°

$a3>a2>a1$

Observing the Bragg condition, although not mandatory, is preferred.

The text below describes different variants of the filter selection for examining the security-relevant properties for the test setup 3:

FP1-3: Testing for Color and Color Flop

Figure 9:
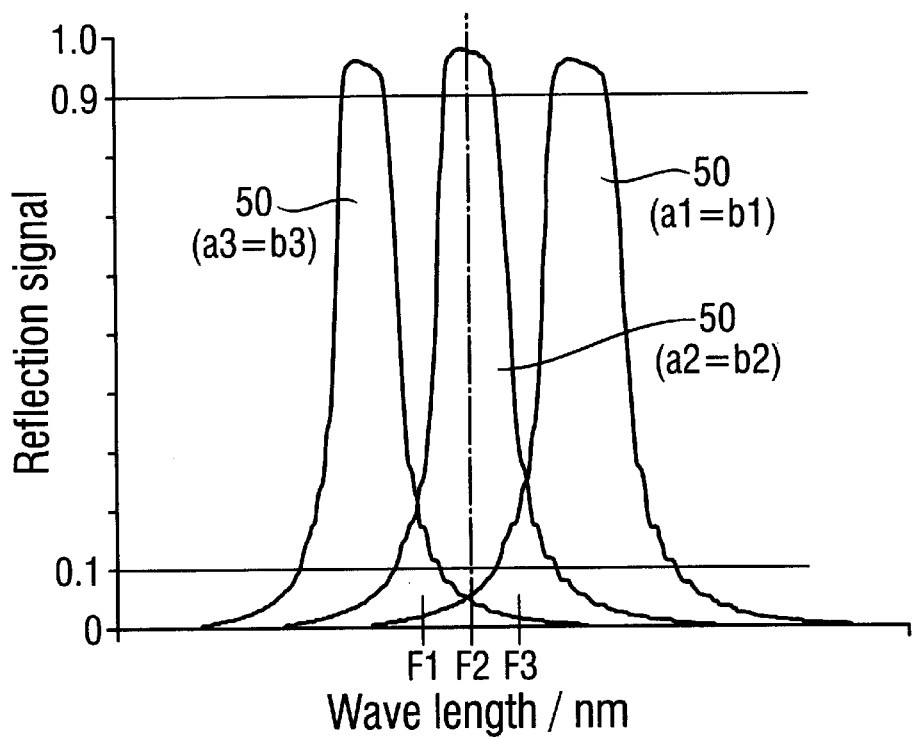
FIG. 9 illustrates a typical reflection band spectrum obtained from the test setup of FIG. 8.

FIG. 9 shows three reflection bands 50 as are typical of the security markings of the invention if illumination/detection is carried out at three different angles a1/b1, a2/b2 and a3/b3. By detection of in each case one point per reflection band with a narrowband color filter it is possible to recognize whether a security marking having the claimed features is present. For the wavelength selection of the filters to be selected (F1 to F3 in FIG. 9) it is the case that:

F1 is chosen so that the wavelength value of the maximum transmission of the filter corresponds to the wavelength value at which the intensity of the shortwave band at angular position (a1, b1) has fallen to <10% of the maximum reflection in the center of the band.

F2 is chosen so that the center wavelength of the band is detected at angular position (a2, b2).

F3 is chosen so that the wavelength value of the maximum transmission of the filter corresponds to the wavelength value at which the intensity of the longwave band at angular position (a3, b3) has fallen to <10% of the maximum reflection in the center of the band.

Figure 10:
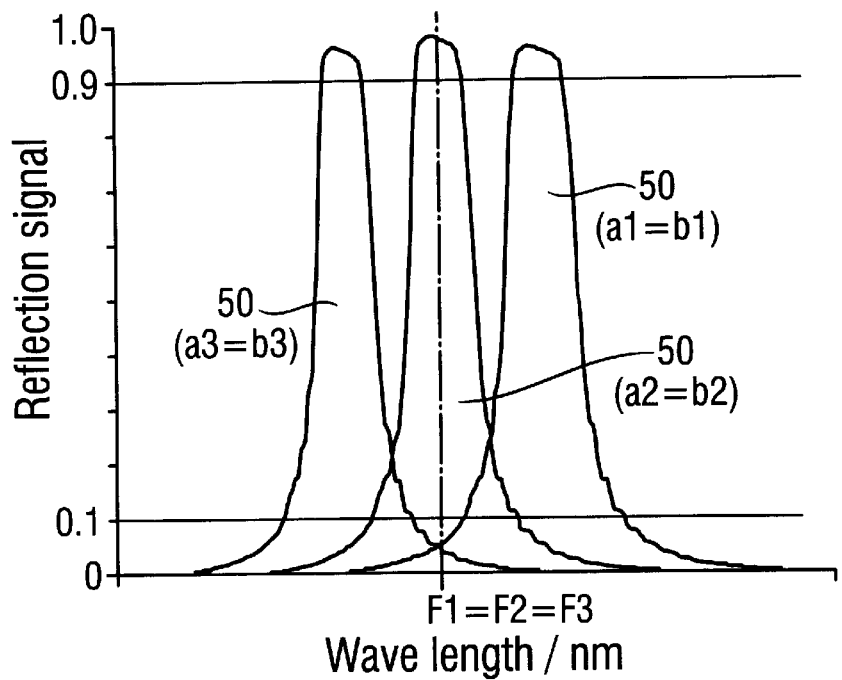
FIG. 10 illustrates a further reflection band spectrum as in FIG. 9, with different filters selected.

FP2-3: Testing for Color and Color Flop with One Filter Type through an Appropriate Choice of Angular Configuration The setup corresponds to TS3, with three identical filters F3=F2=F1 being used in the three beam paths:

For the selection of the filters it is the case that (FIG. 10): shortwave flank at angular position (a1, b1)=center wavelength at angular position (a2, b2)=longwave flank at angular position (a3, b3).

PP1-3: Testing for Polarization

At the angular position (a2, b2) and with the filter F2, the test for polarization is carried out together with the test for color.

The combinations of lighting and detection units specified as preferred for TS1 are likewise preferred for TS3.

Test Setup 4 (TS4)

Structured security markings (corresponding to II1–II3 in Table 1) can be recognized by imaging their entire outline or parts of the outline onto a video camera and comparing the image with an electronically stored master.

Such a setup enables even complex patterns to be recognized by machine in their entirety. Markings with complex structuring provide a sustained increase in the level of proof against forgery.

The test setup TS4 is composed of two beam paths with the angular configurations (a1, b1) and (a2, b2), as described for test setup TS1, or of three beam paths with the angular configurations (a1, b1), (a2, b2) and (a3, b3), as described for test setup TS3.

Figure 11:
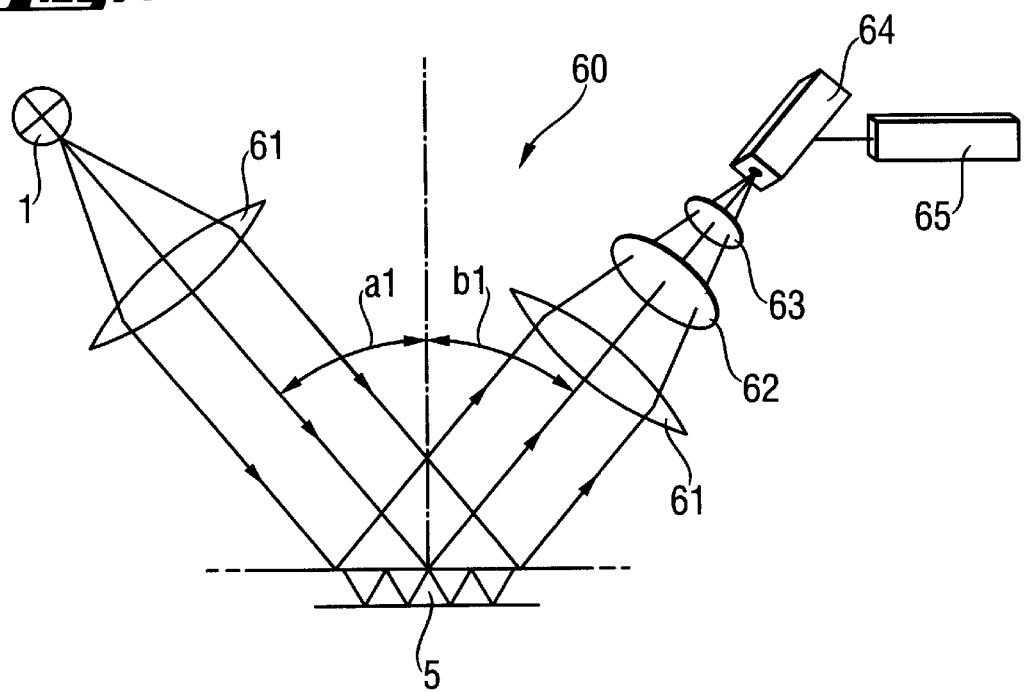
FIG. 11 illustrates a video detection system where the security marking is compared with an electronically stored master security marking.

A test setup 60 of this kind is depicted in FIG. 11, but with only one angular configuration (a1, b1).

The illumination system consists of a light source 1 and an imaging system 61 which illuminates all of the structured security element or part of the structured security element at the angle a1 (for example, LU5).

The light reflected at the angle b1 is analyzed in the detection system. The detection system consists of an imaging system 61, consisting of one or more lenses, one or more color filters 62 and/or polarizers 63, a video camera 64, and the associated evaluation electronics 65. Alternatively, the color filters 62 and/or polarizers 63 can also be accommodated in the beam path between light source 1 and marking 5. The component patterns, distinguished by different color and/or polarization, are digitized and compared with the corresponding electronically stored patterns. The comparison is preferably carried out such that deviations are still accepted within predetermined tolerances.

The text below describes different variants of the filter selection for examining the security-relevant properties for the test setup 4:

FP1-4: Testing for Color and Polarization

By sequential insertion of the various color filters and/or polarizers into the beam path, the component patterns of different color and/or polarization are detected in succession in the video camera.

The selection of the color filters is subject to the criteria as described in connection with the test setups TS1 and TS3.

FP2-4: Expanded Testing for Color

To increase the level of proof against forgery, examination of the color is carried out in analogy to the setup TS1 using not only one filter in the center of the reflection band; instead, the drop in the reflection band is examined by two further filters outside the reflection band 50 (FIG. 5).

The selection of the color filters is subject to the criteria as described for the test setups TS1 and TS3.

FP3-4: Testing for Color Flop

To examine the color flop, the illumination system and detection system are arranged at the angular configuration (a2, b2). The color flop is examined by inserting appropriate color filters.

The selection of the color filters is subject to the criteria as described for the test setups TS1 and TS3.

Alternative Arrangement

Instead of an electronic comparison of the security marking with a master, it is also possible to employ other techniques of pattern recognition, examples being interferometric or holographic pattern recognition.

The test setups are not restricted to the detection, depicted by way of example, of reflective security features. In the same way it is possible to detect security markings on transparent substrates by detection in transmission. In this context, the same criteria for illumination and detection are applicable as for the reflective techniques described.

Table 2 describes the preferred security systems of the invention by reproducing the combination of the security markings of the invention, described in Tab. 1, with the detection systems, as described above, which are preferably suitable in each case. A filter set having components matched to the LC material is to be employed in the test setup for each LC species of the security marking.

TABLE 2

| Group code for type of security marking | Appropriate test setups |
| --- | --- |
| I Uniform security marking comprising one liquid-crystalline species | |
| I1 | Preferably use TS1. Alternatively TS2, TS3 |
| I2 | Preferably use TS1. Alternatively TS2, TS3 |
| I3 | Preferably use TS1. Alternatively TS2, TS3 |
| I4 | Preferably use TS1. Alternatively TS2, TS3 |

TABLE 2-continued

| Group code for type of security marking | Appropriate test setups |
|---|---|
| II Structured security marking comprising at least two different liquid-crystalline species | |
| II1 | Preferably use TS1. Alternatively TS2, TS3, TS4, position detector system or security marking twice |
| II2 | Preferably use TS1. Alternatively TS2, TS3, TS4, position detector system or security marking twice |
| II3 | Preferably use TS1. Alternatively TS2, TS3, TS4, position detector system or security marking twice |
| III Unstructured security marking comprising at least two different liquid-crystalline species | |
| III1 | Preferably use TS1, E1 + E2 = 1, E1/E2 = quantitative ratio of the LC species. Alternatively TS2, TS3 |
| III2 | Preferably use TS1. Signal height dependent on quantitative ratio of the LC species. Alternatively TS2, TS3 |
| III3 | Preferably use TS1. Signal height dependent on quantitative ratio of the LC species. Alternatively TS2, TS3 |
| IV Security marking by multilayer technique | |
| IV1 | Preferably use TS1. Alternatively TS2, TS3 |
| IV2 | Preferably use TS1. Alternatively TS2, TS3 |
| IV3 | Preferably use TS1. Alternatively TS2, TS3 |
| V Security marking comprising liquid-crystalline material into which liquid-crystalline pigments have been incorporated | |
| V1 | Preferably use TS1, E1 + E2 = 1, E1/E2 = quantitative ratio of the LC species. Alternatively TS2, TS3 |
| V2 | Preferably use TS1. Signal height dependent on quantitative ratio of the LC species. Alternatively TS2, TS3 |
| V3 | Preferably use TS1. Signal height dependent on quantitative ratio of the LC species. Alternatively TS2, TS3 |
| VI Three-dimensional arrangement of a uniform liquid-crystalline material in security marking | |
| VI1 | Preferably TS1, alternatively TS4, with the angular definition for a1/b1 and a2/b2 being applied in accordance with Practical Example 3.20. |

The invention additionally relates to the use of the security markings of the invention as a security element on data carriers, documents of value, and identity documents.

The security markings of the invention can be combined with all known security markings, as are described, for example, in DE 3942663.

The examples which follow serve to illustrate the invention:

PRACTICAL EXAMPLE 1.1

Preparing Liquid-crystal Material with a Left-handed Helical Structure

In accordance with Examples 1 and 2 of EP 0 358 208.

PRACTICAL EXAMPLE 1.2

Preparing Liquid-crystal Material with a Left-handed Helical Structure

In accordance with Example 2 of EP 0 601 483.

PRACTICAL EXAMPLE 1.3

Preparing Liquid-crystal Material with a Left-handed Helical Structure

In accordance with Example 4 of U.S. Pat. No. 4,637,896.

PRACTICAL EXAMPLE 1.4

Preparing Liquid-crystal Material with a Right-handed Helical Structure

In accordance with Example 1 of DE 42 34 845.

PRACTICAL EXAMPLE 1.5

Preparing Liquid-crystal Material with a Right-handed Helical Structure

In accordance with Example 55 of WO 95/24454.

PRACTICAL EXAMPLE 1.6

Coloring Liquid-crystalline Materials Using the Liquid-crystalline Materials Obtained in Practical Examples 1.1 to 1.5

A particular desired reflection wavelength (e.g. in accordance with Practical Example 2.1–2.4) and the handedness of the helical structure can be established, for example, by blending liquid-crystal material having a left-handed helical structure from Practical Example 1.1 or 1.2 or 1.3, or by blending liquid-crystal material having a right-handed helical structure with a right-handedly circular-polarizing component with right-handedness from Practical Example 1.4 or 1.5, or in accordance with Example 5 of DE 42 34 845 by blending liquid-crystal material with left-handedness from Practical Example 1.1 or 1.2 or 1.3 with liquid-crystal material with right-handedness from Practical Example 1.4 or 1.5.

By varying the composition of the respective blend it is possible to adjust the reflection wavelength specifically from 200 nm (UV) to 3000 nm (IR).

PRACTICAL EXAMPLE 2.1

Establishing the Reflection Wavelength for a Liquid-crystalline Material which Reflects in the Visible Spectral Region at All Angular Configurations As described in Practical Example 1.6, the reflection wavelength is adjusted so that the shortwave flank of the reflection curve is less than 700 nm at an angular configuration $a1=b1=0°$ (in accordance with FIG. 4) and the longwave flank of the reflection curve is more than 420 nm at an angular configuration $a1=b1=80°$.

PRACTICAL EXAMPLE 2.2

Preparing a Liquid-crystalline Material Which Reflects in the Visible Spectral Region at All Angular Configurations and Whose Reflection Curves Have Been Broadened The procedure of Practical Example 2.1 is repeated with the liquid-crystalline system used being broadened by the methods described in EP 0 606 940.

PRACTICAL EXAMPLE 2.3

Preparing a Liquid-crystalline Material Which Reflects in the Infrared Spectral Region at Certain, Steep Angular Configurations and in the Visible Spectral Region at Flat Angular Configurations As described in Practical Example 1.6, the reflection wavelength is adjusted so that the shortwave flank of the reflection curve is more than 700 nm at an angular configuration a1=b1=0° (in accordance with FIG. 4) and is less than 700 nm at at least one angular configuration a1=b1>0°.

PRACTICAL EXAMPLE 2.4

Preparing a Liquid-crystalline Material Which Reflects in the Visible Spectral Region at Certain, Steep Angular Configurations and Whose Reflection Curves Have Been Broadened The procedure of Practical Example 2.3 is repeated with the liquid-crystalline system used being broadened by the methods described in EP 0 606 940.

PRACTICAL EXAMPLE 2.5

Preparing a Liquid-crystalline Material Which Reflects in the Visible Spectral Region at Certain, Steep Angular Configurations and in the Ultraviolet Spectral Region at Flat Angular Configurations As described in Practical Example 1.6, the reflection wavelength is adjusted so that the longwave flank of the reflection curve is more than 420 nm at an angular configuration a1=b1=0° (in accordance with FIG. 4) and the longwave flank of the reflection curve is less than 420 nm at at least one angular configuration a1=b1>0°.

PRACTICAL EXAMPLE 2.6

Preparing a Liquid-crystalline Material Which Reflects in the Visible Spectral Region at Certain, Steep Angular Configurations and in the Ultraviolet Spectral Region at Flat Angular Configurations and Whose Reflection Curve is Broadened The procedure of Practical Example 2.5 is repeated with the liquid-crystalline system used being broadened by the methods described in EP 0 606 940.

PRACTICAL EXAMPLE 2.7

Preparing Two Liquid-crystalline Materials with the Same Color and Different Handedness of the Helical Structure The two liquid-crystalline materials are prepared such that the characteristic reflection bands of the two materials are not different or at least are so similar that the center wavelengths of the characteristic reflection bands differ by not more than 1% of the center wavelength value and the bandwidths of the reflection bands deviate by less than 2%.

Material 1: rh, material 2: lh.

The center wavelengths and helical handednesses of material 1 and material 2 are adjusted as described in Practical Example 1.6 such that the center wavelengths and bandwidths of material 1 and material 2 correspond to the details given in one of Practical Examples 2.1 to 2.6.

PRACTICAL EXAMPLE 2.8

Preparing Two Liquid-crystalline Materials with Different Color and the Same Handedness of the Helical Structure The two liquid-crystalline materials are prepared as described in Practical Example 2.8a or 2.8b, the center wavelengths of the characteristic reflection bands of the two materials differing by more than 1% of the center wavelength value and/or the bandwidths of the reflection bands deviating by more than 2%.

PRACTICAL EXAMPLE 2.8a

Material 1: rh, material 2, rh. The center wavelengths and handednesses of the helix material 1 and material 2 are adjusted as described in Practical Example 1.6, with the center wavelengths and bandwidths of material 1 and material 2 being adjusted as described in one of Practical Examples 2.1 to 2.6.

PRACTICAL EXAMPLE 2.8b

Material 1: lh, material 2, lh. The center wavelengths and helical handednesses of material 1 and material 2 are adjusted as described in Practical Example 1.6, with the center wavelengths and bandwidths of material 1 and material 2 being adjusted as described in one of Practical Examples 2.1 to 2.6.

PRACTICAL EXAMPLE 2.9

Preparing Two Liquid-crystalline Materials of Different Color and Different Handedness of the Helical Structure The two liquid-crystalline materials are prepared such that the characteristic reflection bands of the two materials are different and the helical handednesses are opposite.

The two characteristic reflection bands differ when the center wavelengths deviate from one another by more than 1% of the center wavelength value and/or the bandwidths of the reflection bands deviate from one another by more than 2%. Material 1: rh, material 2: lh. The center wavelengths and helical handednesses of material 1 and material 2 are adjusted as described in Practical Example 1.6, with the center wavelengths and bandwidths of material 1 and material 2 being adjusted as described in one of Practical Examples 2.1 to 2.6.

PRACTICAL EXAMPLE 3.1

Preparing a Liquid-crystalline Layer on a Support Film

The liquid-crystalline material adjusted in accordance with one of Practical Examples 2.1–2.6 is applied by a method described in EP 358 208 to a tear-resistant plastic, such as a polyester film, and orientation and crosslinking are carried out. In this context it is possible to employ all of the variants described in DE 39 42 663 (e.g. black or colored background, structuring of the background). The resulting support webs with the liquid-crystalline materials can be cut into narrow webs or filaments as described, for example, in DE 39 42 663 and can be embedded as security filaments in paper or other materials. All of the other methods described in DE 39 42 663, for the preparation of transfer elements, for example, are also possible. (DE 39 42 663 is incorporated by reference).

PRACTICAL EXAMPLE 3.2

Producing a Structured Marking from Two Liquid-crystalline Materials of the Same Color and Different Handedness of the Helical Structure in Whole-area Coating A support material, such as a polyester film, is coated as in Practical Example 3.1, independently, with two different liquid-crystalline materials prepared in accordance with Practical Example 2.7. With the aid of known techniques, such as punching, the two films thus obtained are used to prepare patterns which are used in turn to produce a security element consisting of two liquid-crystalline materials of the same color and different helical handedness. This is done, for example, by the processes described in DE 39 42 663 for producing/processing security elements in data carriers.

PRACTICAL EXAMPLE 3.3

Producing a Structured Marking from Two Liquid-crystalline Materials of the Same Color and Different Handedness of the Helical Structure in Whole-area Coating Two different liquid-crystalline materials, prepared as described in Practical Example 2.7, are applied simultaneously to a support material, such as a polyester film, by the method described in EP 358 208 using a chamber-type coating bar with two separate chambers directly adjacent to one another, and then orientation and crosslinking are carried out. The result is a film strip having two different liquid-crystal areas lying directly adjacent to one another. The further processing of a film strip produced in this way is analogous to the processes described in DE 39 42 663.

PRACTICAL EXAMPLE 3.4

Producing a Structured Marking from Two Liquid-crystalline Materials of Different Color and the Same Handedness of the Helical Structure in Whole-area Coating The procedure described in Practical Example 3.2 is repeated with the difference that the liquid-crystalline materials used are prepared as described in Practical Example 2.8 rather than as described in Practical Example 2.7.

PRACTICAL EXAMPLE 3.5

Producing a Structured Marking from Two Liquid-crystalline Materials of Different Color and the Same Handedness of the Helical Structure in Whole-area Coating The procedure described in Practical Example 3.3 is repeated with the difference that the liquid-crystalline materials used are prepared as described in Practical Example 2.8 rather than as described in Practical Example 2.7.

PRACTICAL EXAMPLE 3.6

Producing a Structured Marking from Two Liquid-crystalline Materials of Different Color and Different Helical Handedness in Whole-area Coating The procedure described in Practical Example 3.2 is repeated with the difference that the liquid-crystalline materials used are prepared as described in Practical Example 2.9 rather than as described in Practical Example 2.7.

PRACTICAL EXAMPLE 3.7

Producing a Structured Marking from Two Liquid-crystalline Materials of Different Color and Different Handedness of the Helical Structure in Whole-area Coating The procedure described in Practical Example 3.3 is repeated with the difference that the liquid-crystalline materials used are prepared as described in Practical Example 2.9 rather than as described in Practical Example 2.7.

PRACTICAL EXAMPLE 3.8

Producing a Security Marking Consisting of Two Different Liquid-crystalline Materials Applied Atop One Another, in Whole-area Coating Two different liquid-crystalline materials prepared as described in Practical Example 2.7, 2.8 or 2.9 are each applied independently to a tear-resistant plastic, such as a polyester film, by the method described in EP 358 208, and orientation and crosslinking are carried out. The support webs thus obtained are then laminated by a process known per se, with the aid, for example, of a hotmelt adhesive layer applied to the liquid-crystalline layer. This is described, for example, in DE 39 42 663. The support webs thus obtained can be used in the procedure described in DE 39 42 663 (for example, for producing security filaments).

PRACTICAL EXAMPLE 3.9

Producing a Security Marking Consisting of Two Different Liquid-crystalline Materials Applied Atop One Another, in Whole-area Coating Two different liquid-crystalline materials prepared as described in Practical Example 2.7, 2.8 or 2.9 are applied in succession atop one another to a tear-resistant plastic, such as a polyester film, by the method described in JP 08 146 416 A2. The support webs thus obtained are processed further as described in Practical Example 3.8 to form a security element.

PRACTICAL EXAMPLE 3.10

Producing a Security Marking Consisting of Two Liquid-crystalline Materials, Applied Atop One Another, with the Same Color and Different Handedness of the Helical Structure The procedure of Practical Example 3.8 is repeated using the liquid-crystalline materials prepared as described in Practical Example 2.7.

PRACTICAL EXAMPLE 3.11

Producing a Security Marking Consisting of Two Liquid-crystalline Materials, Applied Atop One Another, with the Same Color and Different Handedness of the Helical Structure (Alternative to Practical Example 3.10)

The procedure of Practical Example 3.9 is repeated using the liquid-crystalline materials prepared as described in Practical Example 2.7.

PRACTICAL EXAMPLE 3.12

Producing a Security Marking Consisting of Two Liquid-crystalline Materials, Applied Atop One Another, with Different Colors and the Same Handedness of the Helical Structure The procedure of Practical Example 3.8 is repeated using the liquid-crystalline materials prepared as described in Practical Example 2.8.

PRACTICAL EXAMPLE 3.13

Producing a Security Marking Consisting of Two Liquid-crystalline Materials, Applied Atop One Another with Different Color and the Same Handedness of the Helical Structure (Alternative to Practical Example 3.12)

The procedure of Practical Example 3.9 is repeated using the liquid-crystalline materials prepared as described in Practical Example 2.8.

PRACTICAL EXAMPLE 3.14

Producing a Security Marking Consisting of Two Liquid-crystalline Materials, Applied Atop One Another, with Different Color and Different Handedness of the Helical Structure The procedure of Practical Example 3.8 is repeated using the liquid-crystalline materials prepared as described in Practical Example 2.9.

PRACTICAL EXAMPLE 3.15

Producing a Security Marking Consisting of Two Liquid-crystalline Materials, Applied Atop One Another, with Different Color and Different Handedness of the Helical Structure The procedure of Practical Example 3.9 is repeated using the liquid-crystalline materials prepared as described in Practical Example 2.9.

PRACTICAL EXAMPLE 3.16

Producing a Security Marking from Liquid-crystalline Pigments with Chiral Phase Which are Incorporated into a Different Liquid-crystalline Material Two different liquid-crystalline materials prepared in accordance with Practical Example 2.7, 2.8 or 2.9 are subjected to further processing as follows: the first material ("material 1") is processed to pigments as described in EP 0 601 483, Example 1B and then incorporated into the second material ("material 2") which is finally applied to a tear-resistant plastic, such as a polyester film, and then orientation and crosslinking are carried out. The proportion of the first material (in pigment form) to the second must be chosen so that the second material can be sufficiently oriented under conditions in accordance with the prior art. The further processing of the coated support web to form a security element takes place in analogy to the methods described in DE 39 42 663.

PRACTICAL EXAMPLE 3.17

Producing a Security Marking from Liquid-crystalline Pigments with Chiral Phase Which are Incorporated into a Different Liquid-crystalline Material, the Two Liquid-crystalline Materials Being of the Same Color and Having Different Handedness of the Helical Structure The procedure of Practical Example 3.16 is repeated using the liquid-crystalline materials prepared as described in Practical Example 2.7.

PRACTICAL EXAMPLE 3.18

Producing a Security Marking from Liquid-crystalline Pigments with Chiral Phase Which are Incorporated into a Different Liquid-crystalline Material, the Two Liquid-crystalline Materials Having Different Colors and the Same Handedness of the Helical Structure The procedure of Practical Example 3.17 is repeated using the liquid-crystalline materials prepared as described in Practical Example 2.8.

PRACTICAL EXAMPLE 3.19

Producing a Security Marking from Liquid-crystalline Pigments with Chiral Phase Which are Incorporated into a Different Liquid-crystalline Material, the Two Liquid-crystalline Materials Having Different Colors and Different Handednesses of the Helical Structure The procedure of Practical Example 3.18 is repeated using the liquid-crystalline materials prepared as described in Practical Example 2.9.

PRACTICAL EXAMPLE 3.20

Figure 12:
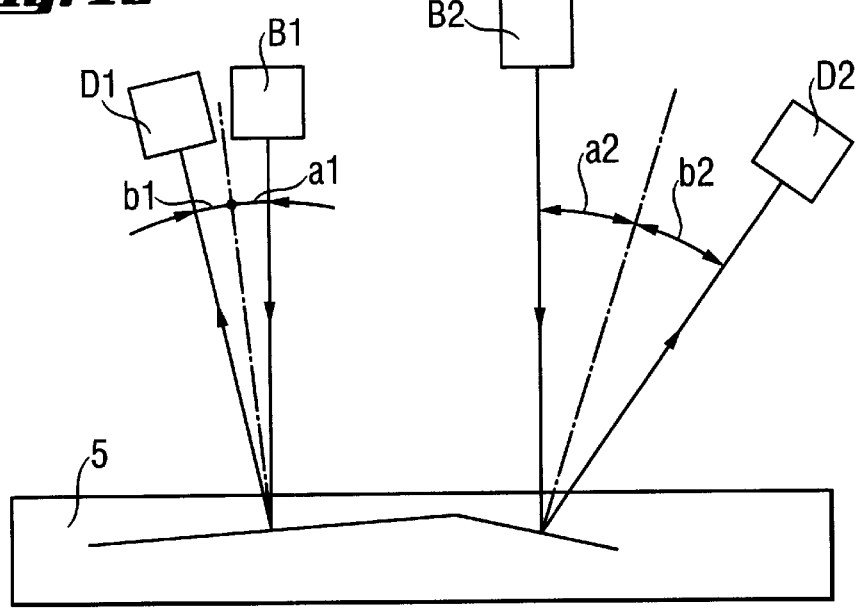
FIG. 12 illustrates a detection system useful for a structured security marking which monitors the reflection bands at two structurally different parts of the marking.

Producing a Security Marking Consisting of a Three-dimensional Arrangement of a Liquid-crystalline Material in a Matrix In this practical example, the pronounced color flop behavior of liquid-crystalline systems with chiral phase under different illumination/detection configurations is exploited by fixing the liquid-crystalline system at different angles in a matrix at different points of a security marking, as is shown, for example, in FIG. 12. For this purpose, the liquid-crystalline material used, which is prepared in accordance with Practical Example 2.1, to 2.6, is first of all applied to a film, such as a polyester film, and then orientation and crosslinking are carried out. A polymer matrix, of PVC, for example, is converted into a sawtoothlike form by means of shaping presses. The support web, consisting of polyester film with applied liquid-crystalline material is then applied to the sawtooth structure—for example, by means of lamination using hot melt adhesive technology—and finally is covered over with a further polymer matrix. In this way, planar security markings are obtained which can be incorporated, for example, into a card.

A security marking 5 produced in this way is detected as follows: as shown in FIG. 12, an illumination/detection system as described, for example, in Practical Example 4.1, produces the following signal at two different points of the security marking:

At the position 1, with B1 and D1, a reflection band having a center wavelength obtained in accordance with equation (I), the angles a1 and b1 being determined (a1=b1) by the positioning of B1 and D1, is obtained, while at the position 2, with B2 and D2, a reflection band is obtained which has a center wavelength corresponding to the Bragg condition (a2=b2).

The above-described Practical Examples 3.1–3.20 deal with liquid-crystalline materials in whole-area application. It is, however, also possible to obtain whole-area effects in accordance with the mosaic principle described in EP 0 685 749, using pigments comprising liquid-crystalline materials with chiral phase. The security markings described in Practical Examples 3.1–3.20 can therefore also be produced from pigments, as described in the following practical examples:

PRACTICAL EXAMPLE 3.21

Preparing a Liquid-crystalline Layer on a Support Film by Screen Printing from Pigments Incorporated into a Binder and Comprising Liquid-crystalline Material with Chiral Phase The liquid-crystalline material from Practical Examples 1.1–1.5, in which the reflection wavelengths have been adjusted as described in Practical Example 2.7 to the levels stated in Practical Examples 2.1–2.6, is processed into pigments by the process described in EP 0 601 483, Example 1B. The pigments thus obtained are applied to a tear-resistant plastic, for example a polyester film, with the aid of conventional screen printing and following their incorporation into an appropriate binder system. The further processing of these films takes place, for example, by the methods described in DE 39 42 663, it also being possible to employ the variants described therein for producing security markings.

PRACTICAL EXAMPLE 3.22

Preparing a Liquid-crystalline Layer of Pigments Comprising Liquid-crystalline Material with Chiral Phase Which are Incorporated into a Polymer Matrix The liquid-crystalline material adjusted in Practical Examples 1.1–1.4 in accordance with Practical Example 2.7 to the wavelength according to Practical Examples 2.1–2.6 is incorporated into a PVC by the method described in EP 0 601 483. Further processing of the resulting films is as described in Practical Example 3.21.

PRACTICAL EXAMPLE 3.23

Producing a Structured Marking from Two Pigments of the Same Color with Different Handedness of the Helical Structure Films comprising liquid-crystalline material are prepared in accordance with Practical Example 3.21 using two different liquid-crystalline materials prepared as described in Practical Example 2.7, the processing of the support films to structured markings taking place as described in Practical Example 3.2.

PRACTICAL EXAMPLE 3.24

Producing a Structured Marking from Two Pigments of the Same Color Comprising Liquid-crystalline Materials with Different Handedness of the Helical Structure The support films are prepared in accordance with Practical Example 3.22 using two different liquid-crystalline materials prepared as described in Practical Example 2.7, the processing of the support films to structured markings taking place as described in Practical Example 3.2.

PRACTICAL EXAMPLE 3.25

Producing a Structured Marking from Two Different-colored Pigments Comprising Liquid-crystalline Materials with the Same Handedness of the Helical Structure The support films are prepared in accordance with Practical Example 3.21 using two different liquid-crystalline materials prepared as described in Practical Example 2.8, the processing of the support films to structured markings taking place as described in Practical Example 3.2.

PRACTICAL EXAMPLE 3.26

Variant of Practical Example 3.25: Producing a Structured Marking from Two Different-colored Pigments Comprising Liquid-crystalline Materials with the Same Handedness of the Helical Structure The support films are prepared in accordance with Practical Example 3.22 using two different liquid-crystalline materials prepared as described in Practical Example 2.8, the processing of the support films to structured markings taking place as described in Practical Example 3.2.

PRACTICAL EXAMPLE 3.27

Producing a Structured Marking from Two Different-colored Pigments Comprising Liquid-crystalline Materials with Different Handedness of the Helical Structure The support films are prepared in accordance with Practical Example 3.21 using two different liquid-crystalline materials prepared as described in Practical Example 2.9, the processing of the support films to structured markings taking place as described in Practical Example 3.2.

PRACTICAL EXAMPLE 3.28

Producing a Structured Marking from Two Different-colored Pigments Comprising Liquid-crystalline Materials with Different Handedness of the Helical Structure The support films are prepared in accordance with Practical Example 3.22 using two different liquid-crystalline materials prepared as described in Practical Example 2.9, the processing of the support films to structured markings taking place as described in Practical Example 3.2.

PRACTICAL EXAMPLE 3.29

Producing an Unstructured Marking Consisting of a Mixture of Pigments of the Same Color Comprising Liquid-crystalline Materials with Different Handedness of the Helical Structure The two liquid-crystalline materials adjusted with respect to one another in terms of color as described in Practical Example 2.5 are each processed independently into pigments by the processes described in EP 0 601 483, Example 1B. The pigments thus obtained are then subjected to further processing in a mixing ratio A:B (% by weight) as follows:

PRACTICAL EXAMPLE 3.29a

A:B=1:1, processing as in Practical Example 3.21 (screen printing process)

PRACTICAL EXAMPLE 3.29b

A:B=2:1, processing as in Practical Example 3.21 (screen printing process)

PRACTICAL EXAMPLE 3.29c

A:B=1:2, processing as in Practical Example 3.21 (screen printing process)

The proportions A:B can be determined from the relative intensities of the reflection bands using, for example, the detection setup described in Practical Example 4.1.

PRACTICAL EXAMPLE 3.30

Producing an Unstructured Marking Consisting of a Mixture of Pigments of the Same Color Comprising Liquid-crystalline Materials with Different Handedness of the Helical Structure The procedure described in Practical Example 3.29 is repeated with the difference that the pigments are processed not as described in Practical Example 3.21 (screen printing process) but as described in Practical Example 3.22 (incorporation into film).

PRACTICAL EXAMPLE 3.31

Producing an Unstructured Marking Consisting of a Mixture of Different-colored Pigments Comprising Liquid-crystalline Materials with the Same Handedness of the Helical Structure The procedure described in Practical Example 3.29 is repeated using the material prepared as described in Practical Example 2.8 rather than the liquid-crystalline material prepared as described in Practical Example 2.7.

PRACTICAL EXAMPLE 3.32

Producing an Unstructured Marking Consisting of a Mixture of Different-colored Pigments Comprising Liquid-crystalline Materials with the Same Handedness of the Helical Structure The procedure described in Practical Example 3.30 is repeated using the material prepared as described in Practical Example 2.8 rather than the liquid-crystalline material prepared as described in Practical Example 2.7.

PRACTICAL EXAMPLE 3.33

Producing an Unstructured Marking Consisting of a Mixture of Different-colored Pigments Comprising Liquid-crystalline Materials with Different Handedness of the Helical Structure The procedure described in Practical Example 3.29 is repeated using the material prepared as described in Practical Example 2.9 rather than the liquid-crystalline material prepared as described in Practical Example 2.7.

PRACTICAL EXAMPLE 3.34

Producing an Unstructured Marking Consisting of a Mixture of Different-colored Pigments Comprising Liquid-crystalline Materials with Different Handedness of the Helical Structure The procedure described in Practical Example 3.30 is repeated using the material prepared as described in Practical Example 2.9 rather than the liquid-crystalline material prepared as described in Practical Example 2.7.

PRACTICAL EXAMPLE 3.35

Producing a Security Marking Consisting of Two Different Pigments Applied by the Screen Printing Process and Comprising Liquid-crystalline Materials Two different liquid-crystalline materials prepared as described in Practical Examples 2.7, 2.8 or 2.9 are used to prepare pigments by the process described in EP 0 601 483, Example 1B. By means of a screen printing process using a screen printing binder, the pigments are each applied independently to a tear-resistant plastic, such as a polyester film. The further processing of the two support webs thus obtained is as described in Practical Example 3.8.

PRACTICAL EXAMPLE 3.36

Variant of Practical Example 3.35: Producing a Security Marking Consisting of Two Different Pigments Incorporated into a Polymer Matrix and Comprising Liquid-crystalline Materials The procedure of Practical Example 3.35 is repeated with the difference that the pigments, instead of the screen printing process, are each incorporated independently into a polymer matrix as described in Practical Example 3.22.

PRACTICAL EXAMPLE 3.37

Preparing Pigments Which Have Been Prepared from Two Different Liquid-crystalline Materials, These Materials Having Been Layered Atop One Another The pigments are prepared as in EP 0 601 483, Example 1C, using as basis a liquid-crystalline double layer which has been applied as described in Practical Example 3.9 to a support film. The liquid-crystalline materials used here have been prepared as described in Practical Examples 2.7, 2.8 or 2.9.

PRACTICAL EXAMPLE 3.38

Producing a Security Marking Consisting of Pigments Which Consist of Two Liquid-crystalline Layers Atop One Another and are Applied by the Screen Printing Process The pigments prepared in Practical Example 3.37 are processed in the screen printing process in analogy to the process described in Practical Example 3.21. The support web thus obtained is processed further to give markings, as described in Practical Example 3.21.

PRACTICAL EXAMPLE 3.39

Variant of Practical Example 3.38: Producing a Security Marking Consisting of Pigments Which Consist of Two Liquid-crystalline Layers Atop One Another and Which are Incorporated into a Polymer Matrix The pigments prepared in Practical Example 3.37 are incorporated into a polymer matrix by the process described in Practical Example 3.22 and are processed further to give markings as described therein.

PRACTICAL EXAMPLE 3.40

Producing a Security Marking Consisting of Two Different Pigments, Applied by the Screen Printing Process and Comprising Liquid-crystalline Materials with the Same Color and Different Handedness of the Helical Structure The procedure described in Practical Example 3.35 is repeated using the liquid-crystalline material prepared as described in Practical Example 2.7.

PRACTICAL EXAMPLE 3.41

Variant of Practical Example 3.40: Producing a Security Marking Consisting of Two Different Pigments, Incorporated into a Polymer Matrix and Comprising Liquid-crystalline Materials with the Same Color and Different Handedness of the Helical Structure The procedure described in Practical Example 3.36 is repeated using the liquid-crystalline material prepared as described in Practical Example 2.7.

PRACTICAL EXAMPLE 3.42

Producing a Security Marking Consisting of Pigments Which Consist of Two Liquid-crystalline Layers Atop One Another, of the Same Color and Different Handedness of the Helical Structure, Which are Applied by the Screen Printing Process The procedure described in Practical Example 3.38 is repeated using the liquid-crystalline material prepared as described in Practical Example 2.7.

PRACTICAL EXAMPLE 3.43

Variant of Practical Example 3.42: Producing a Security Marking Consisting of Pigments Which Consist of Two Liquid-crystalline Layers Atop One Another, of the Same Color and Different Handedness of the Helical Structure, Which are Incorporated into a Polymer Matrix The procedure described in Practical Example 3.39 is repeated using the liquid-crystalline material prepared as described in Practical Example 2.7.

PRACTICAL EXAMPLE 3.44

Producing a Security Marking Consisting of Two Pigments, Applied by Screen Printing Processes, of Different Color and the Same Handedness of the Helical Structure The procedure described in Practical Example 3.35 is repeated using the liquid-crystalline material prepared as described in Practical Example 2.8.

PRACTICAL EXAMPLE 3.45

Variant of Practical Example 3.40: Producing a Security Marking Consisting of Two Different Pigments, Incorporated into a Polymer Matrix and Comprising Liquid-crystalline Materials with Different Color and the Same Handedness of the Helical Structure The procedure described in Practical Example 3.36 is repeated using the liquid-crystalline material prepared as described in Practical Example 2.8.

PRACTICAL EXAMPLE 3.46

Producing a Security Marking Consisting of Pigments Which Consist of Two Liquid-crystalline Layers Atop One Another, of Different Color and the Same Handedness of the Helical Structure, Which are Applied by the Screen Printing Process The procedure described in Practical Example 3.38 is repeated using the liquid-crystalline material prepared as described in Practical Example 2.8.

PRACTICAL EXAMPLE 3.47

Variant of Practical Example 3.42: Producing a Security Marking Consisting of Pigments Which Consist of Two Liquid-crystalline Layers Atop One Another, of Different Color and the Same Handedness of the Helical Structure, Which are Incorporated into a Polymer Matrix The procedure described in Practical Example 3.39 is repeated using the liquid-crystalline material prepared as described in Practical Example 2.8.

PRACTICAL EXAMPLE 3.48

Producing a Security Marking Consisting of Two Different Pigments, Applied by the Screen Printing Process and Comprising Liquid-crystalline Materials of Different Color and Different Handedness of the Helical Structure The procedure described in Practical Example 3.35 is repeated using the liquid-crystalline material prepared as described in Practical Example 2.9.

PRACTICAL EXAMPLE 3.49

Variant of Practical Example 3.40: Producing a Security Marking Consisting of Two Different Pigments, Incorporated into a Polymer Matrix and Comprising Liquid-crystalline Materials with Different Color and Different Handedness of the Helical Structure The procedure described in Practical Example 3.36 is repeated using the liquid-crystalline material prepared as described in Practical Example 2.9.

PRACTICAL EXAMPLE 3.50

Producing a Security Marking Consisting of Pigments Which Consist of Two Liquid-crystalline Layers Atop One Another, of Different Color and Different Handedness of the Helical Structure, Which are Applied by the Screen Printing Process The procedure described in Practical Example 3.38 is repeated using the liquid-crystalline material prepared as described in Practical Example 2.9.

PRACTICAL EXAMPLE 3.51

Producing a Security Marking Consisting of Pigments Which Consist of Two Liquid-crystalline Layers Atop One Another, of Different Color and Different Handedness of the Helical Structure, Which are Incorporated into a Polymer Matrix The procedure described in Practical Example 3.39 is repeated using the liquid-crystalline material prepared as described in Practical Example 2.9.

PRACTICAL EXAMPLE 3.52

Producing a Security Marking from Pigments Comprising Liquid-crystalline Material into Which Pigments Comprising Liquid-crystalline Material are Incorporated, the Liquid-crystalline Materials Used Having the Same Color and Different Handedness of the Helical Structure Coated support webs are prepared as described in Practical Example 3.16 using liquid-crystalline materials prepared in accordance with Practical Example 2.7, and are processed further into pigments as in EP 0 601 483, Example 1B. The pigments thus prepared are processed further by the screen printing process in accordance with Practical Example 3.21.

PRACTICAL EXAMPLE 3.53

Producing a Security Marking from Pigments Comprising Liquid-crystalline Material into Which Pigments Comprising Liquid-crystalline Material are Incorporated, the Liquid-crystalline Materials Used Having the Same Color and Different Handedness of the Helical Structure Coated support webs are prepared as described in Practical Example 3.16 using liquid-crystalline materials prepared in accordance with Practical Example 2.7, and are processed further into pigments as in EP 0 601 483, Example 1B. The pigments thus prepared are processed further into a polymer matrix in accordance with Practical Example 3.22.

PRACTICAL EXAMPLE 3.54

Producing a Security Marking from Pigments Comprising Liquid-crystalline Material into Which Pigments Comprising Liquid-crystalline Material are Incorporated, the Liquid-crystalline Materials Used Having Different Color and the Same Handedness of the Helical Structure Coated support webs are prepared as described in Practical Example 3.16 using liquid-crystalline materials prepared in accordance with Practical Example 2.8, and are processed further into pigments as in EP 0 601 483, Example 1B. The pigments thus prepared are processed further by the screen printing process in accordance with Practical Example 3.21.

PRACTICAL EXAMPLE 3.55

Producing a Security Marking from Pigments Comprising Liquid-crystalline Material into Which Pigments Comprising Liquid-crystalline Material are Incorporated, the Liquid-crystalline Materials Used Having Different Color and the Same Handedness of the Helical Structure Coated support webs are prepared as described in Practical Example 3.16 using liquid-crystalline materials prepared in accordance with Practical Example 2.8, and are processed further into pigments as in EP 0 601 483, Example 1B. The pigments thus prepared are processed further into a polymer matrix in accordance with Practical Example 3.22.

PRACTICAL EXAMPLE 3.56

Producing a Security Marking from Pigments Comprising Liquid-crystalline Material into Which Pigments Comprising Liquid-crystalline Material are Incorporated, the Liquid-crystalline Materials Used Having Different Color and Different Handedness of the Helical Structure Coated support webs are prepared as described in Practical Example 3.16 using liquid-crystalline materials prepared in accordance with Practical Example 2.9, and are processed further into pigments as in EP 0 601 483, Example 1B. The pigments thus prepared are processed further by the screen printing process in accordance with Practical Example 3.21.

PRACTICAL EXAMPLE 3.57

Variant of Practical Example 3.56: Producing a Security Marking from Pigments Comprising Liquid-crystalline Material into Which Pigments Comprising Liquid-crystalline Material are Incorporated, the Liquid-crystalline Materials Used Having Different Color and Different Handedness of the Helical Structure Coated support webs are prepared as described in Practical Example 3.16 using liquid-crystalline materials prepared in accordance with Practical Example 2.9, and are processed further into pigments as in EP 0 601 483, Example 1B. The pigments thus prepared are processed further into a polymer matrix in accordance with Practical Example 3.22.

PRACTICAL EXAMPLE 3.58

Producing a Security Marking Which Consists of a Three-dimensional Arrangement of a Liquid-crystalline Material in a Matrix, the Liquid-crystalline Material Consisting of Pigments Applied by the Screen Printing Process The procedure described in Practical Example 3.20 is repeated but, instead of the direct application of the liquid-crystalline material to the support film, pigments comprising liquid-crystalline material are applied by the screen printing process, as described in Practical Example 3.21.

PRACTICAL EXAMPLE 3.59

Producing a Security Marking Which Consists of a Three-dimensional Arrangement of a Liquid-crystalline Material in a Matrix, the Liquid-crystalline Material Consisting of Pigments Incorporated into a Polymer Matrix The procedure described in Practical Example 3.20 is repeated but, instead of the direct application of the liquid-crystalline material to the support film, pigments comprising liquid-crystalline material are incorporated into a polymer matrix, as described in Practical Example 3.22.

Comparative Example

Detecting a Forged, Circular-polarizing Element with a Setup Described in DE 39 42 663 A1, Page 10

Figure 13:
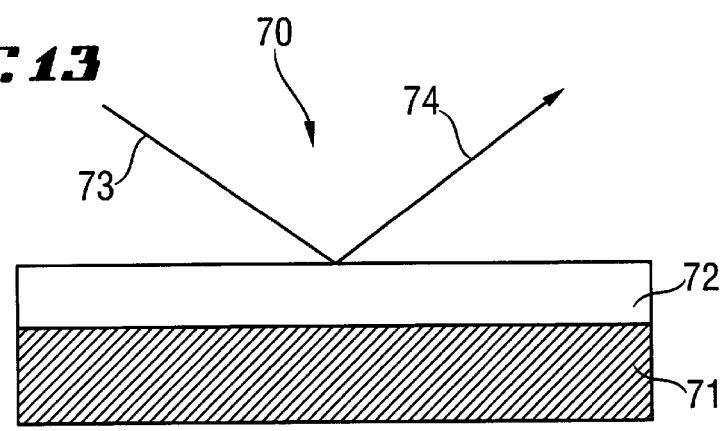
FIG. 13 illustrates a detection system which is incapable of detecting forgery in prior art security markings.

The configuration of the forged, circular-polarizing element 70 is shown in FIG. 13. A reflective layer 71, such as an aluminum foil or a mirror area, for example, is covered over with a circular-polarizing layer 72, such as a commercially obtainable, circular-polarizing film consisting of ¼ film and a linear polarizer, the linear polarizer facing the reflective layer.

Both components together form a circular-reflecting element whose bandwidth is generally much greater than that of cholesteric reflection bands. On irradiation with a light source with unpolarized light 73 there is reflection of circular-polarized light 74 at this element, the portion corresponding to the bandwidth of the color filter passes through the element, is converted by the ¼ film into linear-polarizing radiation and produces full intensity in one of the two detectors 146, 147 while the second detector receives no light. Even if the color flop is tested at a second angle, the large bandwidth of the circular reflection means that the forged element is recognized as genuine.

Therefore, in the setup described in DE 39 42 663 on page 10, a forged security element is erroneously recognized as genuine.

The following Practical Examples 4.1–4.4 show by way of example how security markings can be tested by machine in accordance with the claimed features for color, color flop and polarization.

PRACTICAL EXAMPLE 4.1

Testing a Security Marking of Type I1 with Test Setup TS1

A security marking SM1-1, as described in Tab. 1 under the group code I1, featuring a right-handed LC species which reflects in the IR spectral region, is to be tested.

The security marking was produced by whole-area application in accordance with Example 3.1. The test setup used corresponds to TS1. Testing is carried out for color and color flop, in accordance with the procedure described under FP1-1, and for polarization in accordance with the description under PP1-1. As illumination systems B1 and B2, the arrangement described under LU2 is used both times. For detection D1 at the angle (b1) use is made of a detection system as described under DU1 and for detection D2 at an angle (b2) of a detection system as described under DU3.

The measured signals are evaluated as follows: The signal levels of the respective measurement points of the security element are compared with the signal levels of a security marking produced in the same way (reference). For this purpose, the value of the measured variable at the respective measurement position (center/flank) of the reflection band of the reference is set at 100%, and a deviation in the signal level of the security marking of ±10% in the center of the reflection band and ±25% at the flanks of the reflection band is tolerated. Signal levels of >90% and <110% are set=1, other signal levels are set=0.

Table 3 shows the signals at the detection system when testing a security marking of the invention:

| Illumination | Detection | Filter | Signal at D1 E1 (rh) | E2 (lh) | Signal at D2 D2 |
|---|---|---|---|---|---|
| at angle a1 | at angle b1 | F1 | 1 | 0 | |
| at angle a1 | at angle b1 | F2 | 1 | 0 | |
| at angle a1 | at angle b1 | F3 | 1 | 0 | |

-continued

| Illumination | Detection | Filter | Signal at D1 E1 (rh) | E2 (lh) | Signal at D2 D2 |
|---|---|---|---|---|---|
| at angle a2 | at angle b2 | F4 | | | 1 |
| at angle a2 | at angle b2 | F5 | | | 1 |
| at angle a2 | at angle b2 | F6 | | | 1 |

Recognizing a Forged Security Marking

The test setup TS1 with the components as described is supplied with a forged security marking for testing. The forged security marking has the following configuration: marking with narrow reflection band of the same center wavelength and the same height, with comparable color flop, nonpolarizing.

Table 4 shows the signals at the detection system when testing the forged security marking:

| Illumination | Detection | Filter | Signal at D1 E1 (rh) | E2 (lh) | Signal at D2 D2 |
|---|---|---|---|---|---|
| at angle a1 | at angle b1 | F1 | 0 | 0 | |
| at angle a1 | at angle b1 | F2 | 0 | 0 | |
| at angle a1 | at angle b1 | F3 | 0 | 0 | |
| at angle a2 | at angle b2 | F4 | | | 1 |
| at angle a2 | at angle b2 | F5 | | | 1 |
| at angle a2 | at angle b2 | F6 | | | 1 |

Even a forged security marking with a broad reflection band and lower height but the same center wavelength, without color flop and with right-handed circular-polarization, is recognized as such:

Table 5 shows the signals at the detection system when testing the forged security marking:

| Illumination | Detection | Filter | Signal at D1 E1 (rh) | E2 (lh) | Signal at D2 D2 |
|---|---|---|---|---|---|
| at angle a1 | at angle b1 | F1 | 0 | 0 | |
| at angle a1 | at angle b1 | F2 | 0 | 0 | |
| at angle a1 | at angle b1 | F3 | 0 | 0 | |
| at angle a2 | at angle b2 | F4 | | | 0 |
| at angle a2 | at angle b2 | F5 | | | 0 |
| at angle a2 | at angle b2 | F6 | | | 0 |

Even other combinations, which derive from a deviating form of the reflection band, deviating color flop and deviating polarization property, are recognized as forged security markings.

As further security elements which are recognized as counterfeit there may be mentioned: nonpolarized element, broadband, with color flop; nonpolarized element, narrowband, without color flop; nonpolarized element, narrowband, with color flop; linear-polarized element, broadband, without color flop; linear-polarized element, broadband, with color flop; linear-polarized element, narrowband, without color flop; linear-polarized element, narrowband, with color flop; circular-polarized element, narrowband, without color flop.

A circular-polarized element with broadband and with color flop is recognized as counterfeit unless there is an identical form of the reflection band and the same wavelength shift under oblique illumination. This condition is only met if the forgery consists of the same material as the genuine security marking.

A circular-polarized element with narrowband and with color flop is recognized as counterfeit unless there is an identical form of the reflection band and the same wavelength shift under oblique illumination. This condition is only met if the forgery consists of the same material as the genuine security marking.

PRACTICAL EXAMPLE 4.2

Testing a Security Marking of Type I1 with Test Setup TS2

A security marking SM1-2 as described in Tab. 1 under the group code I1 and featuring a right-handed LC species which reflects in the IR spectral region is tested. The security marking was produced by whole-area application in accordance with Example 3.1.

The test setup used corresponds to TS2. As illumination systems B1 and B2, the arrangement described under LU2 is used both times. For detection by D1, D2, D3 and D4, use is made in each case of a detection system as described under DU6.

The signal level at the detection system is fixed by comparing the security marking to be detected with a master.

The signal levels of the reflection band are standardized to the value=1 in the case of identity but with tolerance of a fluctuation of 20% between the master and security element to be tested. Other signal levels are set at the value=0.

Table 6 shows the signals at the detection system when testing the security marking of the invention:

| | Signal at the detectors | | | |
|---|---|---|---|---|
| Security marking | D1 | D2 | D3 | D4 |
| SM 1-2 | 1 | 0 | 1 | 0 |

Recognizing Forged Security Markings

The test setup TS2 with the components as described is supplied with forged security markings for testing.

The forged security markings have the following configuration:

1. Forged security marking FM1-2 featuring an element that reflects without polarization and otherwise having I1-identical reflection properties.

2. Forged security marking FM2-2, featuring a linear-polarizing, reflective element and otherwise having I1-identical reflection properties.

3. Forged security marking FM3-2, featuring a circular polarizing reflective element with double the bandwidth but with the same handedness.

Table 7 shows the signals at the detectors when testing the forged security markings:

| | Signal at the detectors | | | |
|---|---|---|---|---|
| Forged element | D1 | D2 | D3 | D4 |
| FM1-2 | 0 | 0 | 0 | 0 |
| FM2-2 | 0 | 0 | 0 | 0 |
| FM3-2 | 0 | 0 | 0 | 0 |

PRACTICAL EXAMPLE 4.3

Testing a Security Marking of Type III3 with Test Setup TS3

A security marking SM1-3 as described in Tab. 1 under the group code III3 and featuring two LC species reflecting in the IR spectral region, namely LC species 1 with color 1 and right-handed polarization and LC species two with color 2 and left-handed polarization, is tested. The security marking was produced from pigments in accordance with Example 3.33. The test setup used corresponds to TS3. Testing is carried out for color and color flop in accordance with the procedure described under FP1-3 and for polarization in accordance with the description under PP1-3. Since there are two different colors, FP1-3 has to be employed separately for each color. Both colors are measured at the same angles. As illumination systems B1, B2 and B3 use is made in each case of the arrangement described under LU5. For detection D1 at the angle (b1) use is made of a detection system as described under DU1 and for detection D2 at the angle (b2) of a detection system as described under DU3. For detection D1 and D3 at the angles (b1) and (b3) use is made of detection systems as described under DU3. The security marking is illuminated and detected in an area such that both LC species are detected simultaneously and with comparable areal contents.

The measured signals are evaluated as described in Practical Example 4.1

Table 8 shows the signals at the detection system when testing the security marking of the invention:

|  |  |  | Signal at the detectors | | | |
|---|---|---|---|---|---|---|
| Illumination | Detection | Filter | D1 | E1 (rh) | E2 (lh) | D3 |
| at angle a1 | at angle b1 | F1 for color 1 | 1 | | | |
|  |  | F1 for color 2 | 1 | | | |
| at angle a2 | at angle b2 | F2 for color 1 | | 1 | 0 | |
|  |  | F2 for color 2 | | 0 | 1 | |
| at angle a3 | at angle b3 | F3 for color 1 | | | | 1 |
|  |  | F3 for color 2 | | | | 1 |

Recognizing a Forged Security Marking

The test setup TS2 with the components as described is supplied with a forged security marking for testing. The forged security marking FM1-2 differs from the security marking SM1-3 in that the two colors are present in the same handedness of the polarization—right-handed, for example.

Table 9 shows the signals at the detection system when testing the forged security marking:

|  |  |  | Signal at the detectors | | | |
|---|---|---|---|---|---|---|
| Illumination | Detection | Filter | D1 | E1 (rh) | E2 (lh) | D3 |
| at angle a1 | at angle b1 | F1 for color 1 | 1 | | | |
|  |  | F1 for color 2 | 1 | | | |
| at angle a2 | at angle b2 | F2 for color 1 | | 1 | 0 | |
|  |  | F2 for color 2 | | 1 | 0 | |
| at angle a3 | at angle b3 | F3 for color 1 | | | | 1 |
|  |  | F3 for color 2 | | | | 1 |

PRACTICAL EXAMPLE 4.4

Testing a Security Marking of Type II1 with Test Setup TS4

Figure 14:
FIG. 14 illustrates one embodiment of a structured security marking.

A structured security marking 5 SM1-4 in accordance with FIG. 14, as described in Tab. 1 under the group code II1 and consisting of two LC species with the same reflection bands in UV and different polarization, is tested. The security marking 5 was produced by screen printing pigments in accordance with Example 3.23. The test setup used corresponds to TS4, with the angular configuration (a1=b1) and (a2=b2). As illumination systems B1 and B2, use is made in each case of the lighting unit described under LU6. For detection in D1 and D2 use is made in each case of the detection unit DU7. The filter selection for D1 and D2 is carried out in accordance with the criteria FP1-1 from TS1.

Recognizing a Forged Security Marking 80

Figure 15:
FIG. 15 illustrates a "forged" security marking similar to that of FIG. 14 and prepared from the same materials, but structured differently.

The forged security marking FM1-4 differs from the security marking SM1-4 in that relative to SM1-4 it has been falsely structured (see FIG. 15). Otherwise, however, it is prepared from the same LC species as SM1-4.

The forged security marking 80 FM2-4 differs from the security marking SM1-4 in that it consists of two species with right-handedly and left-handedly circular light reflection in the same spectral region as SM1-4 but with spectrally broadened reflection. The structuring corresponds to SM1-2.

Table 10 shows the signals at the detection system when testing the genuine and the forged security markings:

| Detection in D1 | | | | | | |
|---|---|---|---|---|---|---|
| Filter | F1 | | F2 | | F3 | |
| Polarization | rh | lh | rh | lh | rh | lh |
| SM1–4 | 1 | 1 | 1 | 1 | 1 | 1 |
| FM1–4 | 1 | 1 | 0 | 0 | 1 | 1 |
| FM2–4 | 0 | 0 | 1 | 1 | 0 | 0 |
| Detection in D2 | | | | | | |
| Filter | F4 | | F5 | | F6 | |
| Polarization | rh | lh | rh | lh | rh | lh |
| SM1–4 | 1 | 1 | 1 | 1 | 1 | 1 |
| FM1–4 | 1 | 1 | 0 | 0 | 1 | 1 |
| FM2–4 | 0 | 0 | 1 | 1 | 0 | 0 |

What is claimed is:

1. A security marking, comprising a layer of liquid-crystalline material with chiral phase, wherein present within the security marking are at least two liquid-crystalline materials with chiral phase having a reflection band having a short wave flank and a long wave flank, such that the short wave flank of the reflection band is less than 700 nm when illuminated and viewed normal to the layer of said liquid-crystalline material with chiral phase, and such that the long wave flank of the reflection band is greater than 420 nm when illuminated at −80° from the normal to the surface of said liquid-crystalline material with chiral phase, and viewed at +80° from the normal to the surface of said liquid-crystalline material, said two liquid-crystalline materials with chiral phase differing in color flop, and which are arranged in the form of a structured marking consisting of liquid crystalline pigments or unstructured marking or a multilayer marking or in the form of liquid-crystalline pigments in a liquid-crystalline matrix.

2. A process for producing a security marking as claimed in claim 1, which comprises arranging at least two liquid-crystalline materials with chiral phase which differ in color flop and optionally one or both of handedness or color, in the form of a structured or of an unstructured marking or of a multilayer marking or in the form of liquid-crystalline pigments in a liquid-crystalline matrix.

3. An article labeled with a security marking as claimed in claim 1.

4. The use of a security marking as claimed in claim 1 as a security element on data carriers, documents of value, and identity documents.

5. A security marking in accordance with claim 1 in which at least one liquid-crystalline material with chiral phase having a broadened reflection band is additionally employed.

6. A security marking in accordance with claim 1 in which said security marking is structured.

7. The security marking of claim 6 in which said security marking contains minimally two adjacent coplanar coatings which contain respective liquid-crystalline materials with chiral phase which differ from one another in color flop.

8. A test setup suitable for testing the genuineness of a security marking of claim 1, said test setup comprising:
  a) a spectral detector comprising at least one of
    a)i) a broad band light source, and at least one wavelength selective filter positioned between said broadband light source and a security marking to be tested or positioned between said security marking and a photodetector such that light reflected from said security marking and falling upon said photodetector is filtered broadband light having a spectral intensity distribution different from that of said broadband light; or
    a)ii) a light source emitting discrete wavelength(s), optionally having associated therewith one or more wavelength selective filters which filter the light from said light source emitting discrete wavelength (s) prior to said light falling upon said security marking, or positioned such that light from said light source emitting discrete wavelength(s) and reflected from said security marking passes through said one or more wavelength selective filters prior to falling upon a photodetector; and optionally
  b) a polarization and wavelength selective detector which detects the right- or left-handedness of light reflected from said security marking at one or more wavelengths; wherein at least one of the following conditions is satisfied:
    1) said spectral detector measures reflected light intensity from said security marking at at least two different wavelengths within the reflection bandwidth of at least one liquid-crystalline material having a chiral phase present in said security marking;
    2) said spectral detector measures at least one reflected light intensity from said security marking within the spectral bandwidth of at least one liquid-crystalline material having a chiral phase present in said security marking, and said polarization and wavelength selective detector detects the right- or left-handedness of light reflected from said security marking at at least one wavelength within the reflection band of at least one liquid-crystalline material having a chiral phase present in said security marking.

9. The test setup of claim 8 wherein a plurality of wavelength selective filters positioned i) in succession between said security element and said light source; ii) between said security marking and said photodetector; or iii) at least one filter positioned between either said light source and said security marking or between said security marking and said photodetector, and two or more filters positioned in an alternative location so as to filter light impinging upon or reflected from said security marking, said alternative location different from the location of said at least one filter positioned as heretofore described.

10. The test setup of claim 8 wherein the characteristic form of the reflection band of at least one liquid-crystalline material having a chiral phase is measured by comparing the intensity of light reflected from a security marking being tested at a first wavelength which corresponds to the center wavelength of a liquid-crystalline material having a chiral phase present in a genuine security marking and the intensity of light reflected from said security marking being tested at a second wavelength which corresponds to a wavelength of a liquid-crystalline material having a chiral phase present in a genuine security marking, said second wavelength being a wavelength of said liquid-crystalline material in said genuine security 11. The test setup of claim 8 wherein a given wavelength of reflected light or range thereof is subjected to detection at a first angle normal to the surface of said security marking, and at a second angle, meeting the Bragg condition and which deviates from the normal to the surface to the same degree as the angle of illumination deviates from the normal.

12. The test setup of claim 8 wherein a polarization beam splitting device is positioned between a light source and a photodetector which is positioned to receive light from said light source which has been reflected from said security device.

13. A security system comprising a security marking and a test setup for recognizing the security marking, said test setup comprising at least one light source, at least one wavelength selective element polarization selective element, or both a wavelength selective element and polarization selective element and at least one photodetector which detects light reflected from said security marking, said light having passed through said wavelength selective element, said polarization selective element, prior to or following reflection from said security marking and prior to detection by said photodetector, wherein said security marking is a security marking as claimed in claim 1.

14. The security system as claimed in claim 4, wherein the test setup permits complete identification of one or more selected properties which are characteristic of the liquid-crystalline material with chiral phase.

15. The security system as claimed in claim 14, wherein the properties selected are one or more of the handedness, the color, or the color flop of the liquid-crystalline material with chiral phase or the defined arrangement of the material.

16. The security system of claim 13, wherein said test setup for recognizing a security marking comprises a test setup which detects the characteristic form of the reflection band of at least a portion of said security marking by determining the intensity of reflection at at least two spectrally different points of the reflection band.

17. The security system of claim 16, wherein said different points of the reflection band comprise the center wavelength and a second wavelength in the reflection band where the expected intensity of reflected light is less than 50% of the maximum.

18. The security system of claim 16, wherein said different points of the reflection band comprise the center wavelength and a second wavelength in the reflection band where the expected intensity of reflected light is less than 10% of the maximum.

19. The security system of claim 16, further comprising detecting color flop of said security marking by measuring the reflectance at one angle from the normal to the security marking and at a second angle to said normal to said security marking, said second angle greater than said first angle.

20. An object having a planar surface on which is located a security marking of claim 1, said security marking comprising at least one liquid-crystalline material with chiral phase in a defined three-dimensional arrangement such that said defined three-dimensional arrangement comprises at least two surfaces, a normal to at least one surface being disposed in space at a different angle to a normal to another surface of said at least two surfaces.

* * * * *

UNITED STATES PATENT AND TRADEMARK OFFICE
CERTIFICATE OF CORRECTION

PATENT NO. : 6,570,648 B1
DATED : May 27, 2003
INVENTOR(S) : Christoph Müller-Rees et al.

It is certified that error appears in the above-identified patent and that said Letters Patent is hereby corrected as shown below:

Column 36,
Line 17, after "security" insert the following:
-- marking having a chiral phase which exhibits less than 50% of the reflected light intensity of said center wavelength --.
Line 41, delete "4" and insert therefor -- 13 --.

Signed and Sealed this

Eleventh Day of November, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,570,648 B1                                    Page 1 of 1
DATED         : May 27, 2003
INVENTOR(S)   : Christoph Müller-Rees et al.

It is certified that error appears in the above-identified patent and that said Letters Patent is hereby corrected as shown below:

<u>Title page,</u>
Item [73], Assignee, should read as follows:
-- [73] Assignee:   Consortium für Elektrochemisch Industrie GmbH,
                    München (DE) --.

Signed and Sealed this

Thirtieth Day of December, 2003

JAMES E. ROGAN
*Director of the United States Patent and Trademark Office*